United States Patent
Shiwa

(10) Patent No.: US 12,509,069 B2
(45) Date of Patent: Dec. 30, 2025

(54) DRIVER ASSISTANCE APPARATUS, VEHICLE, RECORDING MEDIUM STORING COMPUTER PROGRAM, AND DRIVER ASSISTANCE METHOD

(71) Applicant: SUBARU CORPORATION, Tokyo (JP)

(72) Inventor: Daiki Shiwa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 57 days.

(21) Appl. No.: 18/708,457

(22) PCT Filed: Sep. 26, 2022

(86) PCT No.: PCT/JP2022/035737
§ 371 (c)(1),
(2) Date: May 8, 2024

(87) PCT Pub. No.: WO2024/069709
PCT Pub. Date: Apr. 4, 2024

(65) Prior Publication Data
US 2025/0042394 A1 Feb. 6, 2025

(51) Int. Cl.
*B60W 30/09* (2012.01)
*B60W 30/095* (2012.01)
*G08G 1/16* (2006.01)

(52) U.S. Cl.
CPC ........ *B60W 30/09* (2013.01); *B60W 30/0956* (2013.01); *G08G 1/166* (2013.01)

(58) Field of Classification Search
CPC ............ B60W 30/0956; B60W 30/095; G08G 1/166; G08G 1/16; G08G 1/167
See application file for complete search history.

(56) References Cited

U.S. PATENT DOCUMENTS

2013/0033368 A1 2/2013 Fukamachi
2017/0287186 A1 10/2017 Saito et al.
(Continued)

FOREIGN PATENT DOCUMENTS

JP H10-211886 A 8/1998
JP 2010-274837 A 12/2010
(Continued)

OTHER PUBLICATIONS

International Search Report received in PCT Application No. PCT/JP2022/035737, dated Nov. 29, 2022.
(Continued)

*Primary Examiner* — Tarek Elarabi
(74) *Attorney, Agent, or Firm* — Rimon P.C.

(57) ABSTRACT

A vehicle control system is a system configured to appropriately perform driver assistance such as automatic driving of a vehicle, while reducing risks considering blind spot areas formed by obstacles. In particular, the vehicle control system is configured to set a virtual risk integrated with latent risks generated individually in order to prevent an abrupt change in speed or the like of the own vehicle. Further, even when other risks are generated on a side different from a side on which the blind spot areas are located, the vehicle control system is configured to set the virtual risk having a smaller value than a maximum value of the latent risks to reduce an influence of the virtual risk.

9 Claims, 17 Drawing Sheets

(56) References Cited

U.S. PATENT DOCUMENTS

| | | | | |
|---|---|---|---|---|
| 2017/0327094 A1* | 11/2017 | Inoue | .................... | B60W 30/09 |
| 2019/0061743 A1 | 2/2019 | Ozawa et al. | | |
| 2022/0194364 A1 | 6/2022 | Ohno et al. | | |
| 2023/0021615 A1 | 1/2023 | Inaba et al. | | |
| 2024/0025398 A1* | 1/2024 | Tanaka | .............. | B60W 30/0956 |
| 2025/0061807 A1* | 2/2025 | Toyoda | .................... | G08G 1/16 |

FOREIGN PATENT DOCUMENTS

| | | | |
|---|---|---|---|
| JP | 2011-194979 | A | 10/2011 |
| JP | 2013-254409 | A | 12/2013 |
| JP | 2017-182567 | A | 10/2017 |
| JP | 2018-034549 | A | 3/2018 |
| JP | 2019-043313 | A | 3/2019 |
| JP | 2021-094953 | A | 6/2021 |
| JP | 2022-099049 | A | 7/2022 |
| WO | 2011/129014 | A1 | 10/2011 |

OTHER PUBLICATIONS

Office Action dated May 7, 2025, issued in corresponding Japanese Application No. 2024-548837, 5 pages.

\* cited by examiner

DRIVER ASSISTANCE APPARATUS, VEHICLE, RECORDING MEDIUM STORING COMPUTER PROGRAM, AND DRIVER ASSISTANCE METHOD

CROSS-REFERENCE TO RELATED APPLICATIONS

This application is the U.S. National Phase under 35 U.S.C. § 371 of International Application No. PCT/JP2022/035737, filed on Sep. 26, 2022.

TECHNICAL FIELD

The disclosure relates to a driver assistance apparatus, a vehicle, a recording medium storing a computer program, and a driver assistance method.

BACKGROUND ART

In recent years, research and development on automatic driving technology and driver assistance technology have been advanced to prevent or reduce accidents and to reduce a driving load. In the automatic driving technology or the driver assistance technology, it is desirable to obtain a driving result securing safety of a driver. For this reason, various methods have been proposed, such as a method of selecting an optimal route in consideration of an obstacle present around an own vehicle.

In particular, a device has also recently appeared which prevents abrupt changes in speed and steering of the own vehicle caused by risks due to a plurality of obstacles that is present on either the left or the right side of a traveling direction. For example, such a device is configured to perform vehicle control on the assumption that the plurality of obstacles present in sequence in the traveling direction is an integrated risk (for example, Patent Literature 1).

CITATION LIST

Patent Literature

Patent Literature 1: Japanese Unexamined Patent Application Publication No. 2010-274837

SUMMARY OF INVENTION

Problem to be Solved by the Invention

However, the device described in Patent Literature 1 fails to consider situations in which risks are generated by obstacles other than the obstacles to avoid. Therefore, in some cases, smooth vehicle control is hindered by the risks assumed to be the integrated risk or the risks generated by the other obstacles.

The disclosure has been made in view of the above problems, and an object of the disclosure is to provide a driver assistance apparatus or the like that makes it possible to appropriately avoid any risk generating around an own vehicle and achieve smooth driving control in automatic driving control.

Means for Solving the Problem

To address the above-described concern, a first aspect of the disclosure provides a driver assistance apparatus configured to execute a driver assistance process in which latent risks are set based on blind spot areas of an own vehicle and driving of the own vehicle is assisted to reduce risks of collisions with objects running out of the blind spot areas. The driver assistance apparatus includes one or more processors and one or more memories communicably coupled to the one or more processors. The one or more processors are configured to, in a case where the blind spot areas are located on either a front left side or a front right side of a traveling direction of the own vehicle, and where a distance between the blind spot areas satisfies a predetermined condition, execute a risk setting process in which a virtual risk is set in a specific region located between the latent risks set based on the blind spot areas. The virtual risk is a risk having a smaller value than a maximum value of the latent risks. The one or more processors are configured to execute a risk distribution data generation process in which risk distribution data is generated based on the latent risks and the virtual risk. The risk distribution data indicates a risk distribution in the traveling direction with respect to the own vehicle.

To address the above-described concern, a second aspect of the disclosure provides a vehicle including a driver assistance apparatus. The driver assistance apparatus is configured to execute a driver assistance process in which latent risks are set based on blind spot areas of an own vehicle, and driving of the own vehicle is assisted to reduce risks of collisions with objects running out of the blind spot areas. The driver assistance apparatus is configured to, in a case where the blind spot areas are located on either a front left side or a front right side of a traveling direction of the own vehicle and where a distance between the blind spot areas satisfies a predetermined condition, execute a risk setting process in which a virtual risk is set in a specific region located between the latent risks set based on the blind spot areas. The virtual risk is a risk having a smaller value than a maximum value of the latent risks. The driver assistance apparatus is configured to execute a risk distribution data generation process in which risk distribution data is generated based on the latent risks and the virtual risk. The risk distribution data indicates a risk distribution in the traveling direction with respect to the own vehicle.

To address the above-described concern, a third aspect of the disclosure provides a recording medium storing a computer program to be applied to a driver assistance apparatus. The driver assistance apparatus is configured to execute a driver assistance process in which latent risks are set based on blind spot areas of an own vehicle, and driving of the own vehicle is assisted to reduce risks of collisions with objects running out of the blind spot areas. The recording medium causes a computer to, in a case where the blind spot areas are located on either a front left side or a front right side of a traveling direction of the own vehicle and where a distance between the blind spot areas satisfies a predetermined condition, execute a risk setting process in which a virtual risk is set in a specific region located between the latent risks set based on the blind spot areas. The virtual risk is a risk having a smaller value than a maximum value of the latent risks. The recording medium causes the computer to execute a risk distribution data generation process in which risk distribution data is generated based on the latent risks and the virtual risk. The risk distribution data indicates a risk distribution in the traveling direction with respect to the own vehicle.

To address the above-described concern, a fourth aspect of the disclosure provides a driver assistance method of executing a driver assistance process in which latent risks are set based on blind spot areas of an own vehicle and driving of the own vehicle is assisted to reduce risks of collisions with objects running out of the blind spot areas.

The method includes executing, in a case where the blind spot areas are located on either a front left side or a front right side of a traveling direction of the own vehicle, and where a distance between the blind spot areas satisfies a predetermined condition, a risk setting process in which a virtual risk is set in a specific region located between the latent risks set based on the blind spot areas, the virtual risk comprising a risk having a smaller value than a maximum value of the latent risks, and executing a risk distribution data generation process in which risk distribution data is generated based on the latent risks and the virtual risk. The risk distribution data indicates a risk distribution in the traveling direction with respect to the own vehicle.

Effects of the Invention

According to the driver assistance apparatus or the like of the disclosure, it is possible to set a route, a speed, or the like that appropriately avoids any risks generating around an own vehicle, including risks based on blind spot areas. This makes it possible to achieve smooth driving in automatic driving control.

MODES FOR CARRYING OUT THE INVENTION

Figure 1:
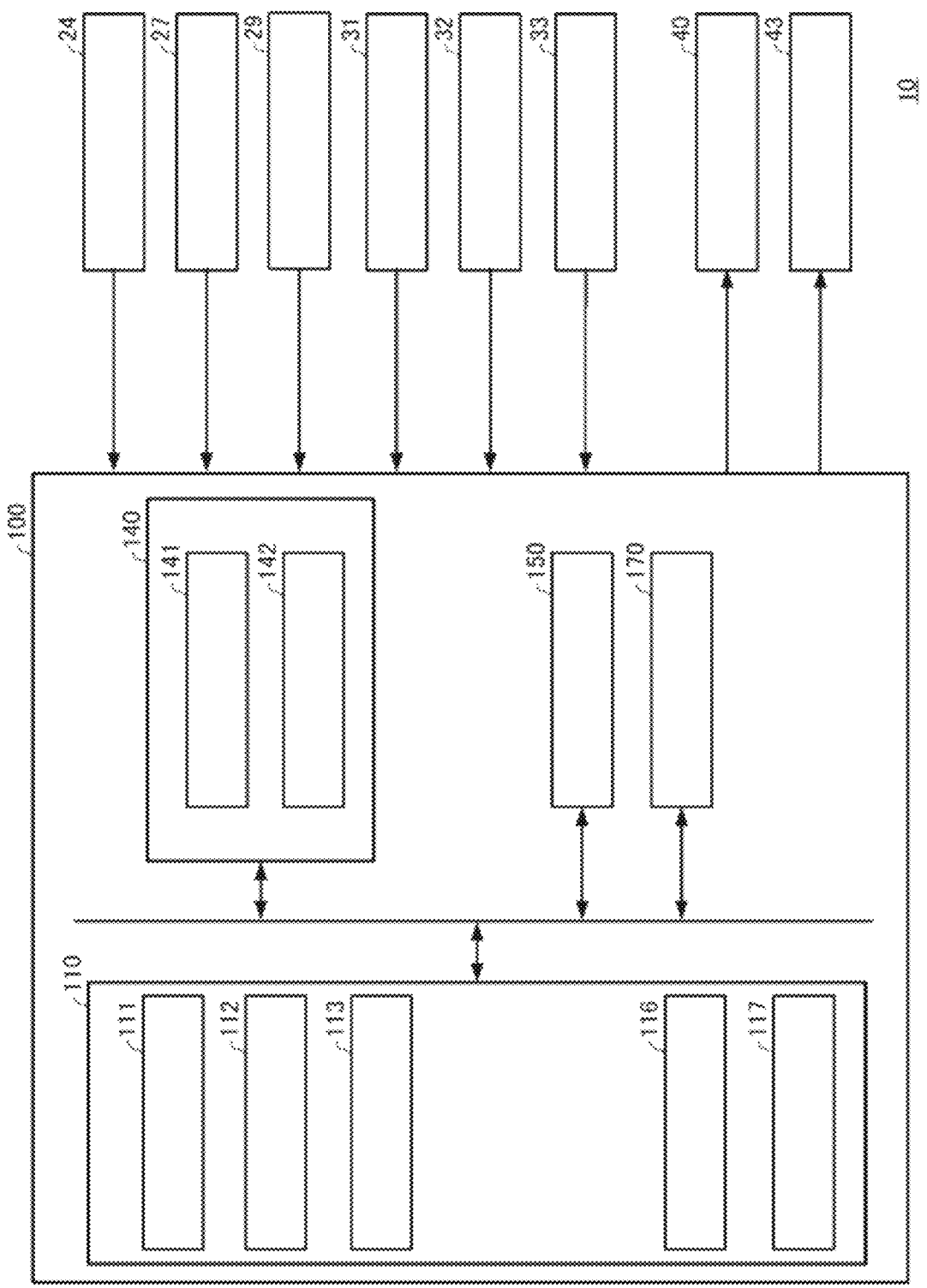
FIG. 1 is an exemplary system configuration diagram illustrating a configuration of a vehicle control system mounted in a vehicle according to one embodiment of the disclosure.

[A] Features of Embodiments of the Disclosure (1) According to an embodiment of the disclosure, a driver assistance apparatus executes a driver assistance process in which latent risks are set based on blind spot areas of an own vehicle and driving of the own vehicle is assisted to reduce risks of collisions with objects running out of the blind spot areas. The driver assistance apparatus includes one or more processors and one or more memories communicably coupled to the one or more processors. In a case where the blind spot areas are located on either a front left side or a front right side of a traveling direction of the own vehicle, and where a distance between the blind spot areas satisfies a predetermined condition, the one or more processors execute a risk setting process in which a virtual risk is set in a specific region located between latent risks set based on the blind spot areas. The virtual risk is a risk having a smaller value than a maximum value of the latent risks. The one or more processors execute a risk distribution data generation process in which risk distribution data is generated based on the latent risks and the virtual risk. The risk distribution data indicates a risk distribution in the traveling direction with respect to the own vehicle.

Note that the embodiment of the disclosure is implementable by a vehicle including the driver assistance apparatus that performs the processes described above, a recording medium storing a computer program for executing the processes described above, or a driver assistance method involving execution of the processes described above.

With such a configuration, the driver assistance apparatus or the like of the disclosure makes it possible to use risks generating individually in the respective blind spot areas as an integrated risk during the driver assistance in the automatic driving control when the distance between the blind spot areas satisfies the condition. In particular, the driver assistance apparatus or the like of the disclosure makes it possible to prevent abrupt changes in speed and steering of the own vehicle during the driver assistance in the automatic driving control, as compared with a case where the route and the speed of the own vehicle are determined by assuming that the blind spot areas have respective risks.

Further, the driver assistance apparatus or the like of the disclosure makes it possible to reduce the virtual risk to a smaller value than the maximum value of the latent risks. Accordingly, even when risks other than the latent risks set based on the blind spot area are generated, it is possible to reduce influences on the driver assistance. For example, even when other risks are set on a side other than the side on which the blind spot areas are located, the driver assistance apparatus or the like of the disclosure makes it possible to set the route and the speed of an own vehicle 1 with consideration of the influences of the other risks to reduce the other risks.

Accordingly, the driver assistance apparatus or the like of the disclosure makes it possible to set a route, a speed, or the like that appropriately avoids any risks generating around the own vehicle, including the risks based on the blind spot areas. This makes it possible to achieve smooth driving in the automatic driving control.

The term "latent risk" refers to a risk that is not apparent and difficult to be recognized by a driver due to the presence of the blind spot area or the like, whereas the term "apparent risk" refers to a risk, such as an obstacle that hinders traveling of the own vehicle, that is already apparent and recognizable by the driver, for example.

The phrase "risks of collisions with objects running out of the blind spot areas" refers to risks of collisions between an own vehicle and objects such as pedestrians or bicycles running out of the blind spot areas.

The term "predetermined condition" refers to a condition that the distance between the blind spot areas is less than a first distance determined in advance and is greater than or equal to a second distance determined in advance, for example. In particular, the "predetermined condition" includes a condition for including a distance in which abrupt changes in speed and steering amount will be caused by the respective risks set based on the blind spot areas, such as a condition for excluding a distance which is less than or equal to the vehicle length and in which no abrupt change in speed or steering amount will be caused.

The term "virtual risk" refers to a risk virtually set and different from an actual risk, such as an obstacle or a blind spot area, set around the own vehicle. The virtual risk is set to achieve smooth driver assistance in the automatic driving control.

The term "risk distribution data" refers to data in which spatial overlapping between potentials of the apparent risks, the latent risks, and the virtual risk is distributed in a two-dimensional manner. In particular, a schematic planar diagram of the "risk distribution data" is referred to as a risk map.

(2) According to an embodiment of the disclosure, the predetermined condition includes a condition that the distance between the blind spot areas is less than the first distance determined in advance and is greater than or equal to the second distance determined in advance.

With such a configuration, the driver assistance apparatus or the like of the disclosure makes it possible to incorporate the distance in which abrupt changes in speed and steering amount will be caused by the respective risks set for the blind spot areas into the distance between the blind spot areas that serves as the condition for setting the virtual risk, for example. Similarly, the driver assistance apparatus or the like of the disclosure makes it possible to exclude a distance which is less than, for example, the vehicle length and in which no abrupt change in speed or steering amount will be caused by the respective risks set for the blind spot areas from the distance between the blind spot areas that serves as the condition for setting the virtual risk. Accordingly, the driver assistance apparatus or the like of the disclosure makes it possible to reduce a processing load on the automatic driving control and improve the efficiency of the processing while limiting a distance range in which smooth driving under the automatic driving control is achievable.

(3) According to an embodiment of the disclosure, the second distance has a value determined based on a vehicle length value.

With such a configuration, the driver assistance apparatus or the like of the disclosure makes it possible to exclude a distance between the blind spot areas that is less than or equal to the vehicle length from the specific region to which the virtual risk is to be set, for example. Accordingly, it is possible to reduce a processing load on the automatic driving control and improve the efficiency of the processing.

(4) According to an embodiment of the disclosure, the driver assistance apparatus executes, as the risk setting process, a process in which risk values that decrease as distances from the respective blind spot areas increase are set when the latent risks are set, and a process in which the virtual risk is set based on the risk values of the latent risks. The virtual risk is spatially continuous to and integrated with the respective latent risks set based on the blind spot areas.

With such a configuration, the driver assistance apparatus or the like of the disclosure makes it possible to set the virtual risk to fill a spatially blank area located between the blind spot areas and having no risk set therein. Accordingly, the driver assistance apparatus or the like of the disclosure makes it possible to prevent abrupt changes in speed and steering of the own vehicle, as compared with the case where the route and the speed of the own vehicle are determined by assuming that the blind spot areas have the respective risks.

(5) According to an embodiment of the disclosure, the driver assistance apparatus executes the risk setting process in which, when a speed of the own vehicle is lower than a predetermined reference speed, a value of the virtual risk is set to a smaller value than a virtual risk to be set when the speed of the own vehicle is higher than the predetermined reference speed.

With such a configuration, the driver assistance apparatus or the like of the disclosure makes it possible to determine driving conditions such as a route and a speed, considering the relation between a steering amount and abrupt steering that varies depending on a vehicle speed. This makes it possible to achieve smooth driving in the automatic driving control.

For example, the driver assistance apparatus or the like of the disclosure makes it possible to set the virtual risk having a larger value as the vehicle speed increases. This makes it possible to prevent abrupt steering. In particular, even at the same steering angle, a lateral acceleration rate (lateral G) of a vehicle generated by steering is larger when the vehicle travels at a high vehicle speed than when the vehicle travels at a low vehicle speed. The driver assistance apparatus or the like of the disclosure thus limits the setting of a route adjacent to the virtual risk by increasing the value of the virtual risk. As a result, it is possible to prevent abrupt steering.

Further, for example, if risks are generated on the opposite side, the driver assistance apparatus of the disclosure refrains from setting a route adjacent to the virtual risk when the vehicle speed is high, whereas sets a route adjacent to the virtual risk when the vehicle speed is low. That is, when the vehicle speed is low, the driver assistance apparatus or the like of the disclosure makes it possible to essentially reduce the value of the virtual risk, considering various risks. This makes it possible to achieve an appropriate route setting.

For example, when the virtual risk is set at a low level such as a risk level 2, the driver assistance apparatus or the like of the disclosure makes it possible to eliminate the need for the settings for higher risk levels such as a risk level 3 or greater, the processing for integrating the virtual risk with the latent risks, and the like.

Accordingly, the driver assistance apparatus or the like of the disclosure makes it possible to set a route or a speed that appropriately avoids any risks generating around the own vehicle. This makes it possible to achieve smooth driving in the automatic driving control. In addition, the driver assistance apparatus of the disclosure makes it possible to reduce a calculation load upon the setting of the driving conditions based on the virtual risk depending on the situations.

(6) According to an embodiment of the disclosure, the one or more processors execute a risk setting process in which the blind spot areas are identified at a predetermined time, the objects possibly present in the blind spot areas identified are assumed, and the latent risks after the predetermined time are set based on a temporal change in the blind spot areas identified, and predicted motions in the blind spot area of the objects assumed.

With such a configuration, the driver assistance apparatus or the like of the disclosure makes it possible to appropriately set the latent risks depending on various situations such as a movement of the own vehicle and a change in surrounding environment, and also appropriately set the virtual risk. The driver assistance apparatus or the like of the disclosure, therefore, makes it possible to set an appropriate route, an appropriate speed, and the like in the automatic driving control. This makes it possible to achieve smooth driving in the automatic driving control.

[B] Details of Embodiments of the Disclosure

In the following, some preferred embodiments of the disclosure are described in detail with reference to the accompanying drawings. Note that, throughout the specification and the drawings, elements having substantially the same functional configurations are denoted by the same reference numerals to omit duplicate description.

[B1] Vehicle Control System

First, an outline of a vehicle control system 10 according to an embodiment of the disclosure that is mounted on the own vehicle 1 and serves as a driver assistance system including a driver assistance control apparatus 100 is described with reference to FIG. 1. FIG. 1 is an exemplary system configuration diagram illustrating a configuration of the vehicle control system 10 that is mounted in the own vehicle 1 according to the embodiment and includes the driver assistance control apparatus 100.

(Outline of Vehicle Control System)

The vehicle control system 10 is an apparatus to be mounted in the own vehicle 1, and is a system that performs driver assistance to cause the own vehicle 1 to automatically travel in an automatic driving mode. The vehicle control system 10 of the present embodiment is configured to set the driving conditions of the own vehicle 1 during the driver assistance in the automatic driving control of the own vehicle 1 (hereinafter referred to as "automatic driving control"). In particular, in a case where the blind spot areas are located on either the front right side or the front left side of a traveling direction of the own vehicle 1, and where the distance between the blind spot areas satisfies a predetermined condition, the vehicle control system 10 of the present embodiment sets a virtual risk to achieve smooth automatic driving control.

Specifically, as illustrated in FIG. 1, the vehicle control system 10 includes a vehicle operation-behavior sensor 27, a global navigation satellite system (GNSS) antenna 29, a vehicle-outside imaging camera 31, and a surrounding environment sensor 32. The vehicle control system 10 further includes a map data memory 33, a human machine interface (HMI) 43, a vehicle driving control processor 40, and the driver assistance control apparatus 100 that performs control to assists a driver in driving the own vehicle 1.

The vehicle operation-behavior sensor 27 and the GNSS antenna 29 are each directly coupled to the driver assistance control apparatus 100. In addition, the vehicle-outside imaging camera 31, the surrounding environment sensor 32, the map data memory 33, the HMI 43, and the vehicle driving control processor 40 are also each directly coupled to the driver assistance control apparatus 100. Note that these components may be indirectly coupled to the driver assistance control apparatus 100 via communication means such as a controller area network (CAN) or a Local Interconnect Network (LIN).

(Vehicle Operation-Behavior Sensor)

The vehicle operation-behavior sensor 27 includes one or more sensors that detect an operational state or a behavior of the vehicle. For example, the vehicle operation-behavior sensor 27 includes one or more of a vehicle speed sensor, an acceleration sensor, and an angular velocity sensor to detect information on vehicle behaviors, such as a vehicle speed, a longitudinal acceleration rate, a lateral acceleration rate, and a yaw rate. In addition, the vehicle operation-behavior sensor 27 includes one or more of an accelerator position sensor, a brake stroke sensor, a brake pressure sensor, a steering angle sensor, an engine speed sensor, a brake lamp switch, and a turn signal lamp switch, for example. The vehicle operation-behavior sensor 27 detects information on vehicle operational states, such as a steering angle of a steering wheel or steering angles of steered wheels, an accelerator position, a brake operation amount, turning on or off of the brake lamp switch, and turning on or off of the turn signal lamp switch.

The vehicle operation-behavior sensor 27 includes a driving mode switch to detect information on the setting of the automatic driving mode. The vehicle operation-behavior sensor 27 sends sensor signals including the detected information to the driver assistance control apparatus 100.

(GNSS Antenna)

The GNSS antenna 29 receives satellite signals from satellites such as the global positioning system (GPS). The GNSS antenna 29 sends information on a vehicle position on map data included in the received satellite signals to the driver assistance control apparatus 100. In place of the GNSS antenna 29, an antenna may be provided to receive satellite signals for identifying a vehicle position from another satellite system.

(Vehicle-Outside Imaging Camera)

The vehicle-outside imaging camera 31 captures an image of the surrounding environment of the own vehicle 1 and generates image data on an imaging range. The vehicle-outside imaging camera 31 may be mounted as a safety function that secures safety of the own vehicle 1. For example, the vehicle-outside imaging camera 31 may include imaging devices such as charged-coupled devices (CCD) or a complementary metal-oxide-semiconductors (CMOS). The vehicle-outside imaging camera 31 may send the generated image data to the driver assistance control apparatus 100.

The vehicle-outside imaging camera 31 may be installed on the own vehicle 1 so as to capture images of environments in one or more of a frontward direction, lateral directions, and a backward direction of the vehicle. The vehicle-outside imaging camera 31 may include one camera unit or multiple camera units.

(Surrounding Environment Sensor)

The surrounding environment sensor 32 is a sensor that detects people or obstacles present around the own vehicle 1. For example, the surrounding environment sensor 32 includes one or more sensors of a high frequency radar sensor, an ultrasonic sensor, and a LiDAR. In particular, the surrounding environment sensor 32 has a function of detecting various objects, such as other vehicles, bicycles, buildings, poles, traffic signs, traffic lights, or natural objects, present around the own vehicle 1. The surrounding environment sensor 32 sends sensor signals including the detected data to the driver assistance control apparatus 100.

(Map Data Memory)

The map data memory 33 is a storage device such as a storage element, a magnetic disk, an optical disk, or a flash memory. The map data memory 33 is a storage medium storing the map data.

Examples of the storage element include a random access memory (RAM) and a read only memory (ROM). Examples of the magnetic disk include a hard disk drive (HDD). Examples of the optical disk include a compact disc (CD) and a digital versatile disc (DVD). Examples of the flash memory include a solid state drive (SSD) and a universal serial bus (USB) memory.

The map data of the present embodiment includes data on a reference path which is a reference traveling track for each road.

Note that the map data memory 33 of the present embodiment may be a storage medium storing map data for a navigation system (not illustrated) that performs the driver assistance and guides the own vehicle 1 to a destination.

(HMI)

The HMI 43 is driven by the driver assistance control apparatus 100 and has a function of notifying the driver of various pieces of data by means of image displaying or sound outputting. For example, the HMI 43 includes a non-illustrated display device or speaker disposed in an instrument panel.

The display device may be a display device of the navigation system. In addition, the HMI 43 may include a head-up display (HUD) that superimposes an image on a surrounding landscape of the vehicle on the front window.

(Vehicle Driving Control Processor)

The vehicle driving control processor 40 includes one or more control systems that control driving of the own vehicle 1. The vehicle driving control processor 40 includes an engine control system or a motor control system that controls driving of the vehicle, an electric power steering system that controls the steering angles of the steering wheel and the steered wheels, or a brake system that controls a braking force of the vehicle. Note that the vehicle driving control processor 40 may include a transmission system that converts an output received from the engine or the drive motor and transmits the converted output to drive wheels.

When the driving conditions are set by the driver assistance control apparatus 100 during the automatic driving mode, the vehicle driving control processor 40 performs the control for the driver assistance in the automatic driving based on the set driving conditions. Specifically, the vehicle driving control processor 40 controls the engine control system or the motor control system, the electric power steering system that controls the steering angles of the steering wheel and the steered wheels, or the brake system that controls the braking force of the vehicle based on the set driving conditions.

(Driver Assistance Control Apparatus)

The driver assistance control apparatus 100 detects a risk level that indicates the degree of a risk that the driver feels with respect to an obstacle present around the own vehicle 1 and a risk factor that makes the driver feel the risk, and performs control such as automatic driving of the own vehicle 1 while reducing the risks felt by the driver.

In particular, the driver assistance control apparatus 100 receives the image data sent from the vehicle-outside imaging camera 31, the detection data on the surrounding environment sent from the surrounding environment sensor 32, or both of these pieces of data (hereinafter collectively referred to as "surrounding environment data"). Further, the driver assistance control apparatus 100 receives the data on the operational state and the behavior sent from the vehicle operation-behavior sensor 27. The driver assistance control apparatus 100 further receives the information on the vehicle position on the map data (hereinafter referred to as "position information") sent from the GNSS antenna 29. Based on these pieces of the data and information received, the driver assistance control apparatus 100 executes the automatic driving control of the own vehicle 1.

Specifically, the driver assistance control apparatus 100 acquires the data on the reference path stored in the map data memory 33. The driver assistance control apparatus 100 sets the driving conditions of the own vehicle 1 so that the own vehicle 1 will not contact with a pedestrian or an obstacle (hereinafter referred to as an "obstacle" unless otherwise cited). Based on the driving conditions, the driver assistance control apparatus 100 sends a control command to the vehicle driving control processor 40.

[B2] Vehicle

Figure 2:
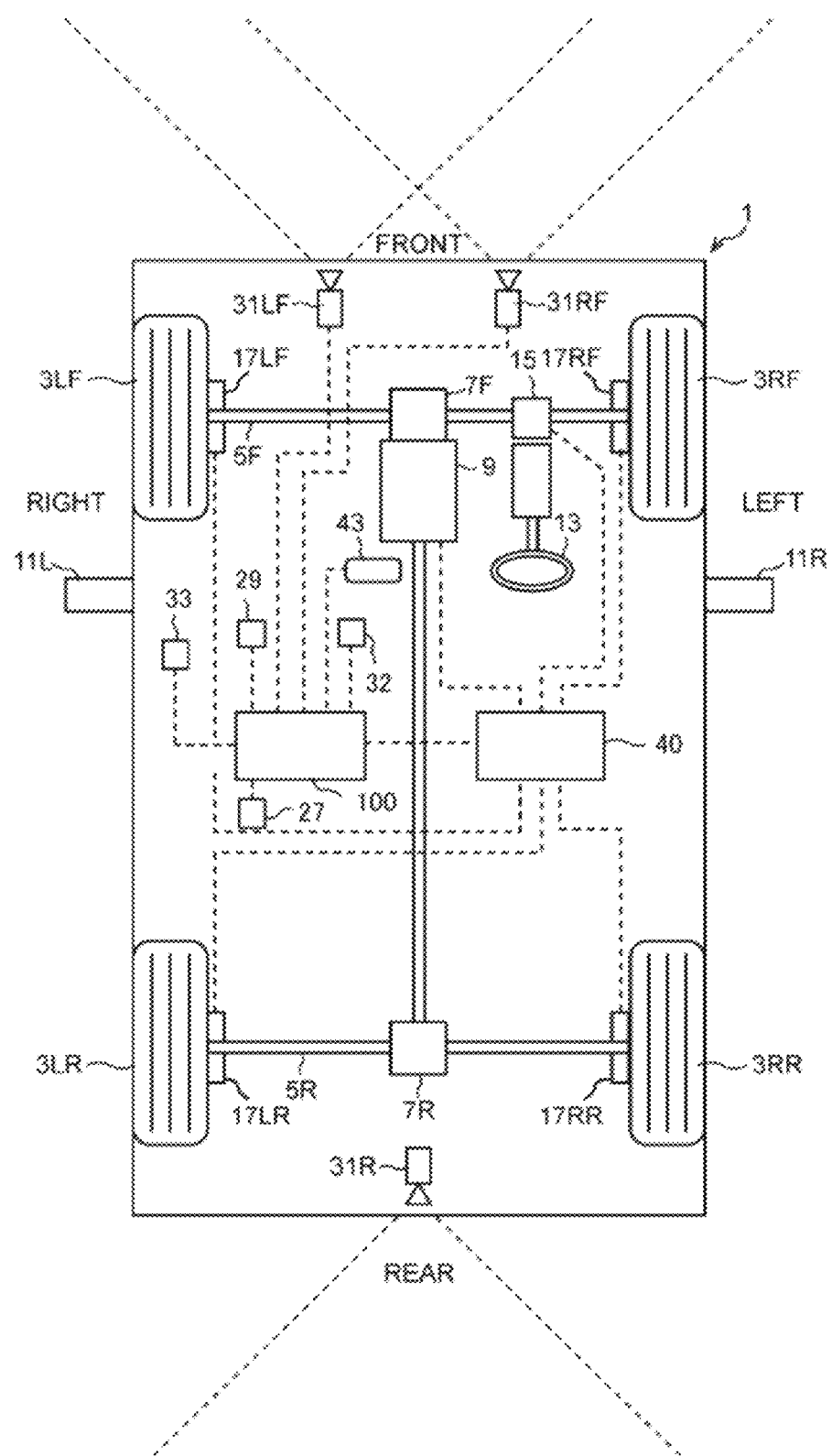
FIG. 2 is a schematic diagram of a configuration example of the vehicle in which the vehicle control system according to one embodiment is mounted.

Next, an example of an overall configuration of the vehicle 1 (the own vehicle 1) according to the present embodiment is described with reference to FIG. 2. FIG. 2 is a schematic diagram illustrating the configuration example of the vehicle 1 in which the vehicle control system 10 according to the present embodiment is mounted.

As illustrated in FIG. 2, the vehicle 1 includes a drive power unit 9 that generates driving torque for the vehicle. The drive power unit 9 may be an internal combustion engine, such as a gasoline engine or a diesel engine, or a drive motor, or may include both of the internal combustion engine and the drive motor. For example, the vehicle 1 may be an electric vehicle having two drive motors including a front-wheel drive motor and a rear-wheel drive motor, or an electric motor including drive motors corresponding to the respective wheels 3. When the vehicle 1 is an electric vehicle or a hybrid electric vehicle, the vehicle 1 includes a secondary battery that stores electric power to be supplied to the drive motor, or a power generator, such as a secondary battery, that stores electric power to be supplied to the drive motor, or power generate, such as a motor or a fuel cell, that generates electric power to be supplied to the battery.

The vehicle 1 includes, as devices used for the driving control of the vehicle 1, the drive power unit 9, an electric steering device 15, and brake devices 17LF, 17RF, 17LR, and 17RR (hereinafter collectively referred to as "brake devices 17" when no particular distinction is required). The drive power unit 9 outputs drive torque to be transmitted to a front-wheel drive shaft 5F and a rear-wheel drive shaft 5R via a non-illustrated transmission, a front-wheel differential mechanism 7F, and a rear-wheel differential mechanism 7R. Driving of the drive power unit 9 and driving of the transmission are controlled by the vehicle driving control processor 40 that includes one or more electronic control units (ECU).

The front-wheel drive shaft 5F is provided with the electric steering device 15. The electric steering device 15 includes a non-illustrated electric motor and a non-illustrated gear mechanism. The electric steering device 15 adjusts steering angles of a left-front wheel 3LF and a right-front wheel 3RF under the control of the vehicle driving control processor 40. During manual driving, the vehicle driving control processor 40 controls the electric steering device 15 based on a steering angle of the steering wheel 13 operated by the driver. During automatic driving, the vehicle driving control processor 40 controls the electric steering device 15 based on a set traveling track.

The brake devices 17LF, 17RF, 17LR, and 17RR impart a braking force to the left-front wheel 3LF, the right-front wheel 3RF, the left-rear wheel 3LR, and the right-rear wheel 3RR, respectively. The brake device 17 is, for example, a hydraulic brake device, and hydraulic pressure to be supplied to the respective brake devices 17 are controlled by the vehicle driving control processor 40 to generate a predetermined braking force. When the own vehicle 1 is an electric vehicle or a hybrid electric vehicle, the brake device 17 is used together with regenerative braking by the drive motor.

The vehicle driving control processor 40 includes one or more electronic control units that control driving of the drive power unit 9 that outputs drive torque for the vehicle 1, driving of the electric steering device 15 that controls steering angles of the steering wheel and the steered wheels, and driving of the brake device 17 that controls the braking force of the vehicle 1. The vehicle driving control processor 40 may have a function of controlling driving of the transmission that converts an output outputted from the drive power unit 9 and transmits the converted output to the wheels 3. The vehicle driving control processor 40 is configured to acquire information sent from the driver assistance control apparatus 100 and execute the automatic driving control of the vehicle 1.

The vehicle 1 includes the vehicle-outside imaging camera 31 and the surrounding environment sensor 32. The vehicle-outside imaging camera 31 includes front imaging cameras 31LF and 31RF, and a rear imaging camera 31R. The vehicle 1 further includes the vehicle operation-behavior sensor 27 that acquires information on the surrounding environment of the vehicle 1, the GNSS antenna 29, and the human machine interface (HMI) 43.

In particular, the front imaging cameras 31LF and 31RF and the rear imaging camera 31R capture images of the environment in front of the vehicle 1 and the environment behind the vehicle 1 to generate image data. For example, the front imaging cameras 31LF and 31RF serve as a stereo camera that includes a pair of left and right cameras. The rear imaging camera 31R serves as a so-called monocular camera. Note that each of the front imaging cameras 31LF and 31RF and the rear imaging camera 31R may be either a stereo camera or a monocular camera. In the present embodiment, the rear imaging camera 31R may be omitted.

As the vehicle-outside imaging camera 31, the vehicle 1 of the present embodiment may include cameras that are provided on respective side mirrors 11L and 11R and capture images of a left-rear environment and a right-rear environment, respectively, in addition to the front imaging cameras 31LF and 31RF and the rear imaging camera 31R.

[B3] Driver Assistance Control Apparatus

Next, an exemplary configuration of the driver assistance control apparatus 100 of the present embodiment is described with reference to FIG. 1 described above.

The driver assistance control apparatus 100 includes one or more processors such as central processing units (CPU) or micro processing units (MPU). Note that part or the entire of the driver assistance control apparatus 100 may be configured by updatable software such as firmware, or a program module or the like to be executed in response to a command from the CPU or the like.

The driver assistance control apparatus 100 executes the computer program to perform the automatic driving control while reducing the risks, such as contact between an object and the own vehicle 1 to assist, generating in the blind spot areas or peripheral areas of the blind spot areas.

Specifically, as illustrated in FIG. 1, the driver assistance control apparatus 100 includes a processor 110, a memory 140, an information storage medium 150, and a communicator 170. Note that some of these components may be omitted.

The processor 110 reads and executes an application program (hereinafter also referred to as an "application") stored in the information storage medium 150 to perform various kinds of processing of the present embodiment.

Note that any application may be stored in the information storage medium 150. Alternatively, the processor 110 of the present embodiment may read the program or data stored in the information storage medium 150, temporarily store the read program or data in the memory 140, and perform processing based on the program and the data.

In particular, the processor 110 performs various kinds of processing by using a main memory unit in the memory 140 as a work area. Functions of the processor 110 are implemented by various processors (e.g., CPU and DSP) such as hardware or application programs. Specifically, the processor 110 includes a communication control unit 111, a surrounding environment detection unit 112, a vehicle data acquisition unit 113, a driving condition setting unit 116, and a notification control unit 117. Note that some of these components may be omitted.

The communication control unit 111 performs a process of sending and receiving data to/from the management server 20. In particular, the communication control unit 111 controls the communicator 170 to establish network communications including an inter-vehicular communication, a road-to-vehicle communication, and a mobile communication network.

The surrounding environment detection unit 112 detects the information on the surrounding environment of the own vehicle 1 based on the image data sent from the vehicle-outside imaging camera 31 and the data sent from the surrounding environment sensor 32. Specifically, the surrounding environment detection unit 112 performs image processing on the image data sent from the vehicle-outside imaging camera 31 to thereby identify people, other vehicles, bicycles, buildings, natural objects, and other obstacles present around the own vehicle 1 using an object detection technique.

In particular, the surrounding environment detection unit 112 calculates the positions of these objects with respect to the own vehicle 1, or the distance and relative speed between the own vehicle 1 and these objects. Thereafter, the surrounding environment detection unit 112 stores the data on the detected obstacles present around the own vehicle 1 as time-series data in the memory 140.

Alternatively, the surrounding environment detection unit 112 may identify various kinds of blind spot areas, which are not visually recognizable by the driver, formed by the above-described obstacles present around the own vehicle 1, based on various pieces of information received from external devices via a V2X communication or the like. For example, in this case, the surrounding environment detection unit 112 identifies the blind spot areas based on the positions, kinds, and sizes of the obstacles and the various pieces of information.

Further, the surrounding environment detection unit 112 may identify a position of the own vehicle 1 on the map data using the position information of the own vehicle 1 acquired from the GNSS antenna 29, and may identify the blind spot areas based on the information on the above-described obstacles present around the own vehicle 1.

The vehicle data acquisition unit 113 acquires the data on the operational state and the behavior of the own vehicle 1 based on the sensor signal sent from the vehicle operation-behavior sensor 27. For example, the data on the operational state and the behavior of the own vehicle 1 includes data on a vehicle speed, a longitudinal acceleration rate, a lateral acceleration rate, a yaw rate, steering angles of the steering wheel and the steered wheels, an accelerator position, a brake operation amount, turning on or off of the brake lamp switch, and turning on or off of the turn signal lamp switch. The data on the operational state and the behavior of the own vehicle 1 includes data on turning on or off of the automatic driving mode of the own vehicle 1. The vehicle data acquisition unit 113 stores the acquired data on the operational state and the behavior of the own vehicle 1 In the memory 140 as time-series data.

Based on the detected obstacles, the detected blind spot areas, and the like, the driving condition setting unit 116 performs a driving condition setting process in which driving conditions are set to perform the automatic driving control. Thereafter, the driving condition setting unit 116 provides information on the set driving conditions (hereinafter referred to as "driving condition information") to the vehicle driving control processor 40.

Specifically, when the own vehicle 1 is caused to travel in the automatic driving mode along a route to a set destination, the driving condition setting unit 116 sets at least a route (traveling track) and a vehicle speed so that the own vehicle 1 will not contact with the obstacles, and sends a control command to the vehicle driving control processor 40.

At this time, the driving condition setting unit 116 sets the route and the vehicle speed of the own vehicle 1 using risk potentials which are indices each indicating the possibility of contact between the own vehicle 1 and an obstacle. In particular, the driving condition setting unit 116 of the present embodiment uses, as the risk potential, the apparent risks that are visible risks such as obstacles, the latent risks latescent from the presence of the blind spot areas, and the virtual risk virtually set.

The notification control unit 117 controls driving of the HMI 43 to perform various kinds of control for notifying the driver of the content of the set driving conditions. In particular, the notification control unit 117 of the present embodiment notifies the driver of the content of the set driving conditions after the traveling control of the own vehicle 1 is performed.

For example, when the traveling track is changed to pass by a detected pedestrian or obstacle, the notification control unit 117 notifies the driver of a message, "The vehicle has passed through an area adjacent to the left side of the road to secure a distance from the pedestrian." In addition, for example, when the vehicle speed is lowered, the notification control unit 117 notifies the driver of a message, "The vehicle has been decelerated to secure safety of the pedestrian." Note that the notification control unit 117 makes the notification to the driver by one or both of the means of sound and displaying.

Note that the notification control unit 117 may not necessarily notify the driver of the driving conditions for the automatic driving control.

The memory 140 serves as a work area of the processor 110 or the like, and functions of the memory 140 are implemented by hardware such as a RAM (VRAM) or the like. The memory 140 of the present embodiment includes a main memory unit 141 that is used as a work area, and a data memory unit 142 that stores data to be used to execute various kinds of processing. In particular, the data memory unit 142 stores standard data, reference data, and the like to be used in various kinds of processing, in addition to computer programs, table data, and risk distribution data.

Note that some of these components may be omitted. The computer program is a program that causes a processor to perform various kinds of processing to be performed by the driver assistance control apparatus 100. Further, the computer program may be stored in the recording medium built in the driver assistance control apparatus 100 or any external recording medium attachable to the driver assistance control apparatus 100.

The information storage medium 150 is readable by a computer. The information storage medium 150 may store various kinds of data such as various applications and operating systems (OS). For example, the information storage medium 150 may be a storage device, a magnetic disk, an optical disk, a flash memory, or the like.

The communicator 170 performs various kinds of control to establish a communication with a non-illustrated vehicle-outside device. Functions of the vehicle-outside device are implemented by hardware such as various processors or ASICs for communication, computer programs, or the like.

[B4] Driver Assistance Control Process in Automatic Driving Control of Present Embodiment

[B4.1] Outline

Figure 3:
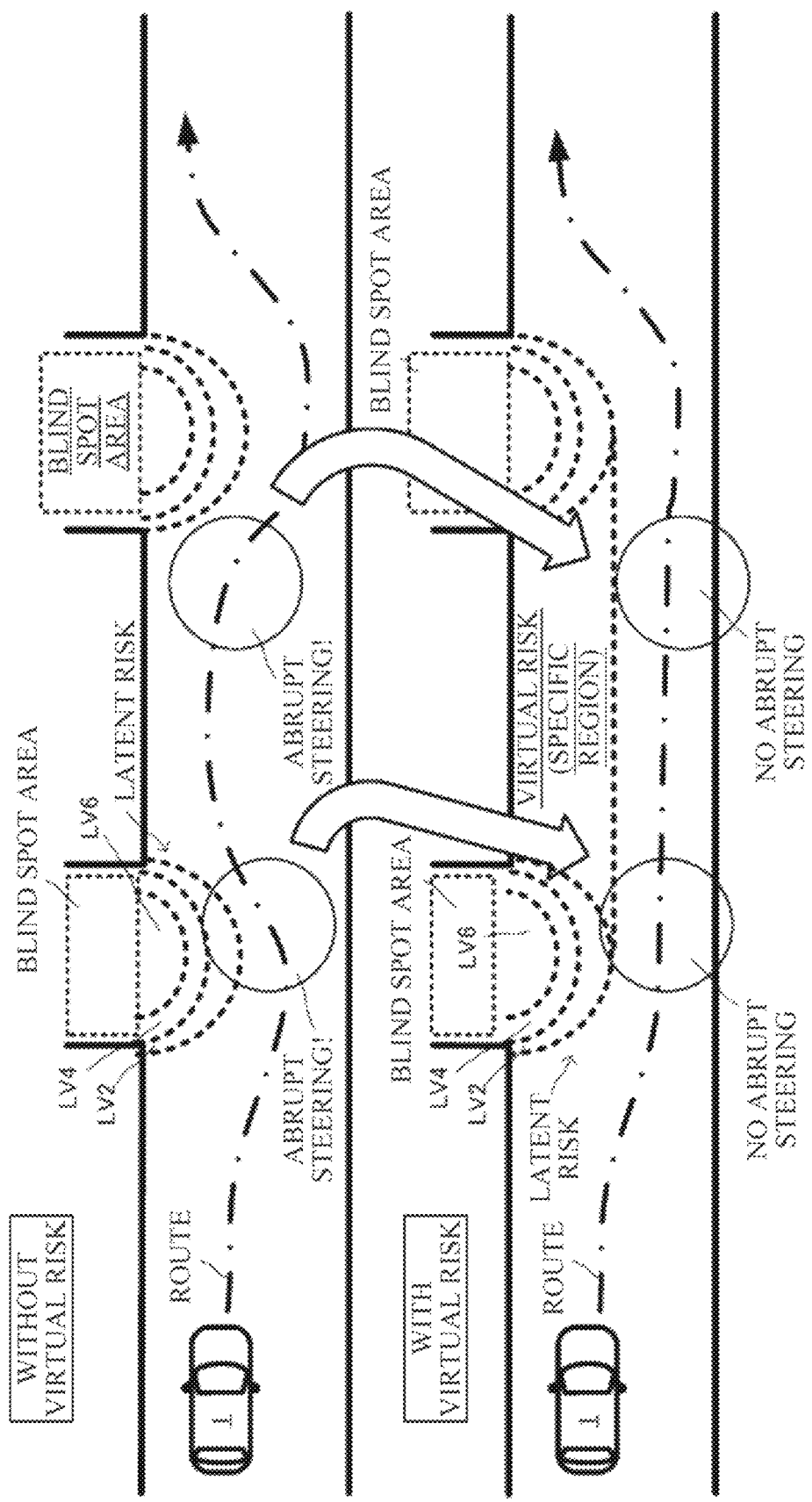
FIG. 3 is a diagram for describing a driver assistance control process in automatic driving control to be performed by the vehicle control system according to one embodiment.
Figure 4:
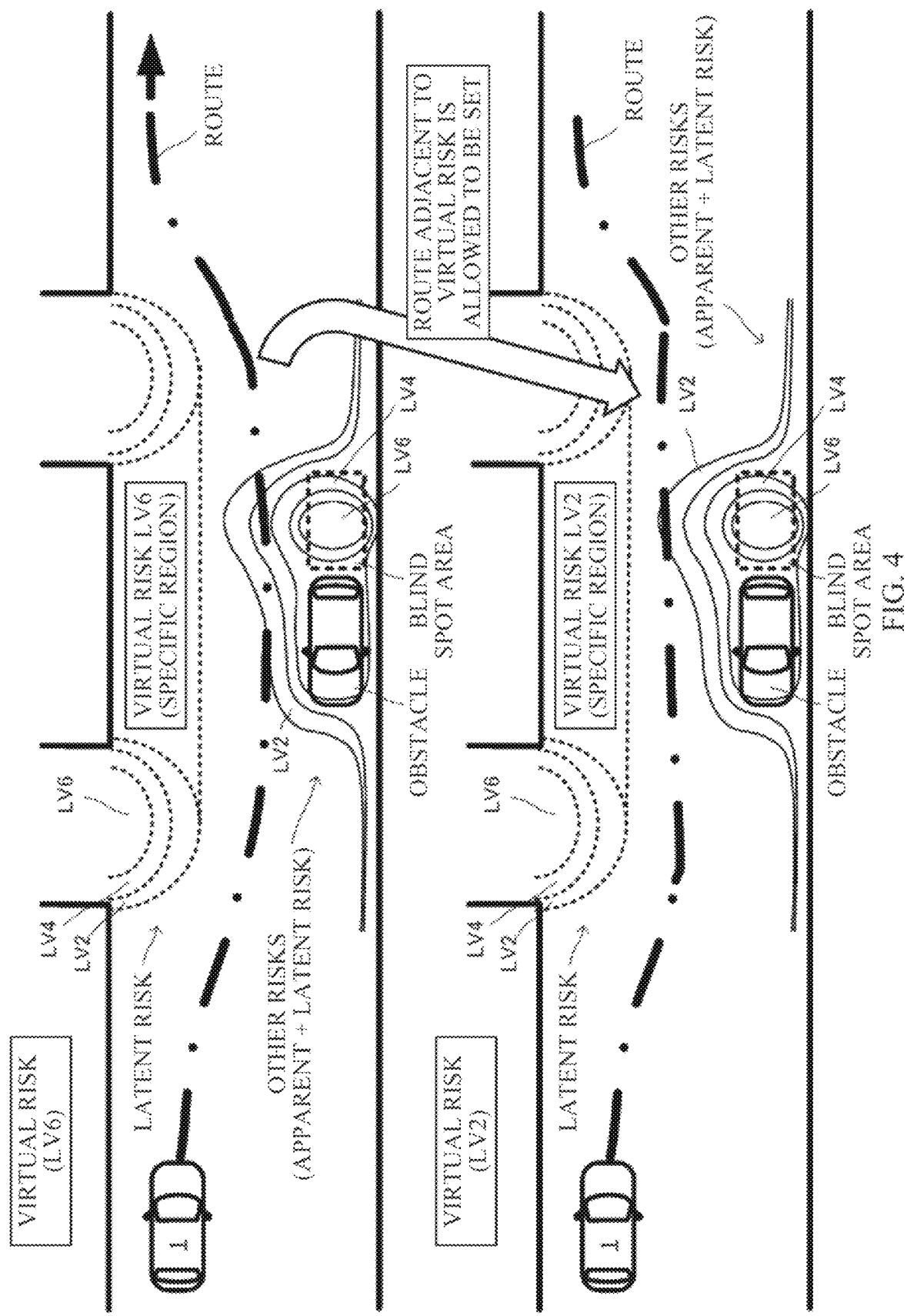
FIG. 4 is a diagram for describing the driver assistance control process in the automatic driving control to be performed by the vehicle control system according to one embodiment.
Figure 5:
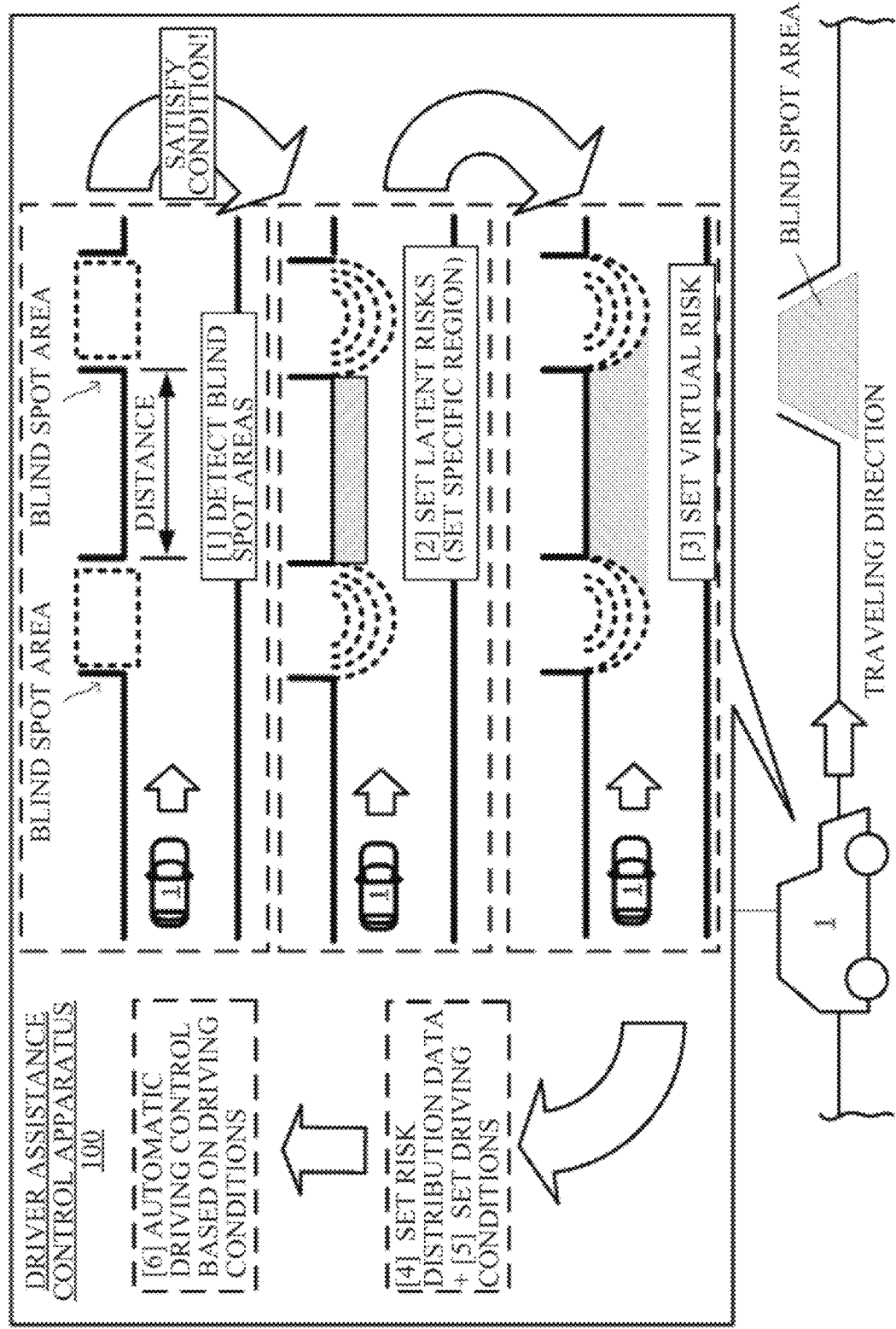
FIG. 5 is a diagram for describing the driver assistance control process in the automatic driving control to be performed by the vehicle control system according to one embodiment.

Next, the drive assistance control process in the automatic driving control to be performed by the vehicle control system 10 of the present embodiment is described with reference to FIGS. 3 to 5. FIGS. 3 to 5 are diagrams for describing the driving assistance control process in the automatic driving control to be performed by the vehicle control system 10 of the present embodiment.

The driver assistance control apparatus 100 of the present embodiment performs the automatic driving control of the own vehicle 1 while reducing the risks felt by the driver using the risk level (risk potential) that indicates the presence or degree of the risk felt by the driver with respect to the obstacle present around the own vehicle 1. That is, when an obstacle or a blind spot area is detected, the driver assistance control apparatus 100 performs the automatic driving control to avoid the obstacle and to reduce the factor that makes the driver feel a risk with respect to the obstacle in order to enhance the reliability of the automatic driving control.

In particular, when the blind spot areas are located within a predetermined distance range on either the front left side or the front right side of the traveling direction of the own vehicle 1, the vehicle control system 10 of the present embodiment sets the virtual risk to the region between the blind spot areas in the process of the risk distribution data.

For example, as illustrated in FIG. 3, if the route and the speed of the own vehicle 1 are determined by assuming that the blind spot areas located adjacent to either the left side or the right side of the traveling direction have respective latent risks, abrupt changes in speed and steering of the own vehicle 1 are caused in some cases. To address such a concern, even in such a case, the vehicle control system 10 of the present embodiment uses the virtual risk that integrates the latent risks generating individually with each other to prevent the abrupt changes in speed and steering of the own vehicle 1 in association with the automatic driving control, as illustrated in FIG. 3.

Further, as illustrated in FIG. 4, for example, if the risk value of the virtual risk is increased while another risk is generated on the other side opposite to the side on which the blind spot areas are located, the range of choices of speed and route of the own vehicle 1 becomes smaller. In such a case, the speed or the route that increases the risk with respect to the latent risks may be possibly set. In this case, even when the route is set adjacent to the virtual risk, an actual collision with another object will not occur because the virtual risk is not a risk actually present. Accordingly, in such a case, the vehicle control system 10 of the present embodiment sets the virtual risk having a smaller value than the maximum value of the latent risks to reduce the influence of the virtual risk. That is, as illustrated in FIG. 4, the vehicle control system 10 lowers the risk value of the virtual risk to allow the route to be set adjacent to the virtual risk. This makes it possible to set an appropriate route even when a high risk is generated on the other side.

In the example illustrated in FIG. 3, the route set as the driving condition differs depending on the presence of the virtual risk. When the virtual risk is not set, abrupt turning of the steering wheel (abrupt steering) occurs at two locations. In contrast, when the virtual risk is set, a smooth route is determined.

In the example illustrated in FIG. 4, the route for the automatic driving is selected in a situation where another vehicle is present as an obstacle on an opposite lane to the lane of the own vehicle 1, and where a blind spot area is generated by the obstacle. In such a situation, in the example illustrated in an upper part of FIG. 4, the route adjacent to the obstacle and having a high risk level is selected when the virtual risk is set to a maximum value (LV6). In contrast, in the example illustrated in a lower part of FIG. 4, the route sufficiently remote from the obstacle and having a low risk level is selected when the virtual risk is set to a value (LV2) less than the maximum value.

In the examples illustrated in FIGS. 3 and 4, the maximum value of the risk levels (risk values) is 6 (LV6), and illustration of cases for a risk level 1 (LV1) and lower risk levels is omitted.

As described above, the vehicle control system 10 of the present embodiment uses the risks generating individually due to the blind spot areas as the integrated risk, and reduces the influence on the driver assistance even when another risk different from the integrated risk occurs.

Specifically, the vehicle control system 10 performs a process in which the virtual risk is set in a case where the blind spot areas are located on either the front left side or the front right side of the traveling direction of the own vehicle 1, and where the distance between the blind spot areas satisfies a predetermined condition. In particular, as illustrated in FIG. 5, when given conditions including the condition regarding the blind spot areas are satisfied, the vehicle control system 10 performs the risk setting process in which the virtual risk is set in a specific region between the latent risks set based on the blind spot areas. Further, the vehicle control system 10 sets the virtual risk as a risk having a smaller value than the maximum value of the latent risks. Further, as illustrated in FIG. 5, the vehicle control system 10 performs a risk distribution data generation process in which the risk distribution data is generated based on the latent risks and the virtual risk. The risk distribution data indicates the risk distribution in the traveling direction with respect to the own vehicle 1.

After the setting of the risk distribution data, the vehicle control system 10 of the present embodiment performs a driving condition setting process in which the driving conditions such as a route and a speed of the own vehicle 1 are set based on the risk distribution data as illustrated in FIG. 5. Based on the driving conditions set as described above, the vehicle control system 10 performs the automatic driving control.

In the present embodiment, for example, the predetermined condition (hereinafter referred to as a "virtual risk setting condition") is a condition that the distance between the blind spot areas is less than a first distance determined in advance and greater than or equal to a second distance determined in advance. The virtual risk setting condition may include a condition for including a distance in which abrupt changes in speed and steering amount will be caused by the respective latent risk set based on the blind spot areas, such as a condition for excluding a distance which is less than or equal to the vehicle length and in which no abrupt change in speed or steering amount will be caused.

With such a configuration, when the condition regarding the distance between the blind spot areas located on either the front left side or the front right side of the traveling direction of the own vehicle 1 is satisfied, the vehicle control system 10 of the present embodiment makes it possible to use the risks generating individually due to the respective blind spot areas as the integrated risk in the automatic driving control. In particular, the vehicle control system 10 makes it possible to prevent abrupt changes in speed and steering of the own vehicle 1 during the automatic driving control, as compared with the case where the route and speed of the own vehicle 1 are determined by assuming that the blind spot areas have the respective risks.

Further, the vehicle control system 10 makes it possible to set the virtual risk to a smaller value than the maximum value of the latent risks. Accordingly, even when another risk is generated which is different from the latent risks generated by the blind spot areas, it is possible to reduce the influence on the automatic driving control. For example, even when the other risk is set on the other side different from the side on which the blind spot areas are located, the vehicle control system 10 makes it possible to achieve smooth driver assistance, such as the setting of the route and the speed of the own vehicle 1, with low risks, taking into consideration the influence of the other risk.

Accordingly, the vehicle control system 10 makes it possible to set the route, the speed, or the like that makes it possible to appropriately avoid any risks including the risks due to the blind spot areas and the risks generating around the own vehicle 1. This makes it possible to achieve smooth driving in the automatic driving control.

[B4.2] Setting of Risk Distribution Data (Risk Map)

Next, the risk distribution data, which is the data on a spatial distribution of the risks to be used to set the driving conditions of the present embodiment, and the risk map of the risk distribution data are described with reference to FIGS. 6 to 9.

Figure 6:
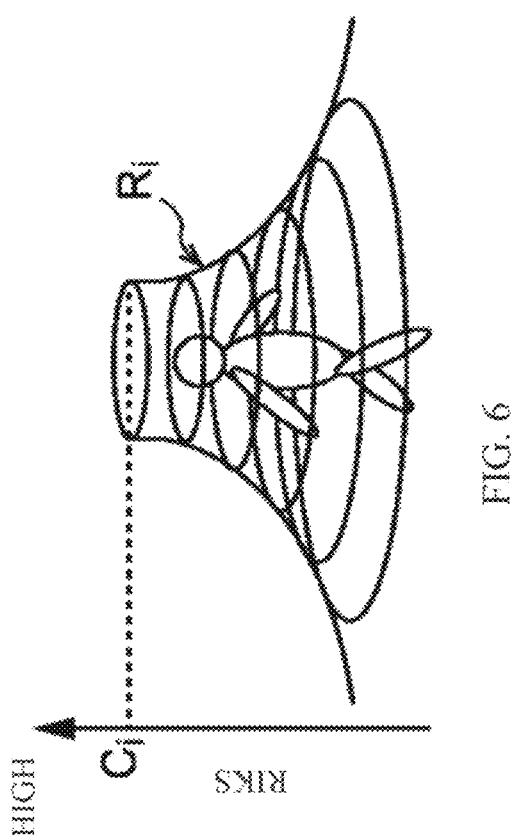
FIG. 6 is a diagram for describing a risk potential to an obstacle which is a pedestrian according to one embodiment.
Figure 7:
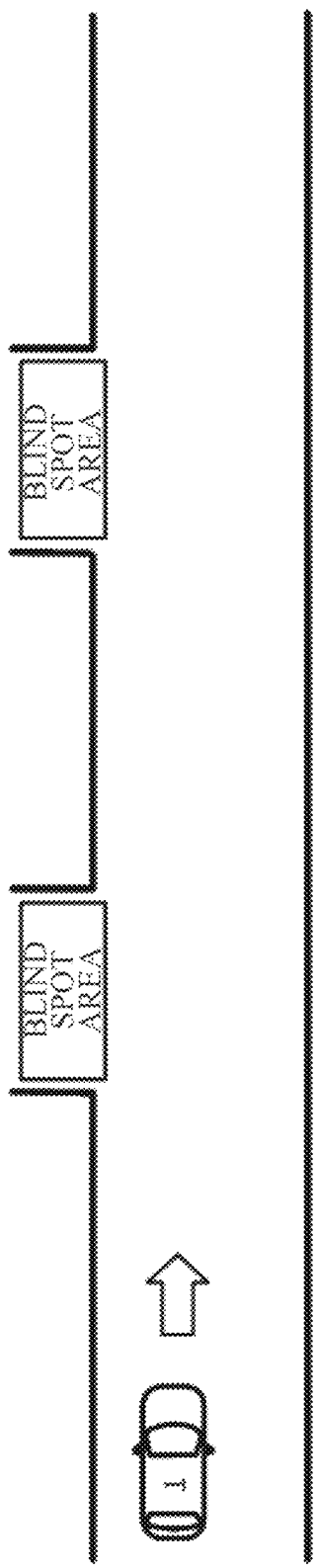
FIG. 7 is a diagram for describing a virtual risk and illustrating a relation between blind spot areas, latent risks, and the virtual risk according to one embodiment.
Figure 8:
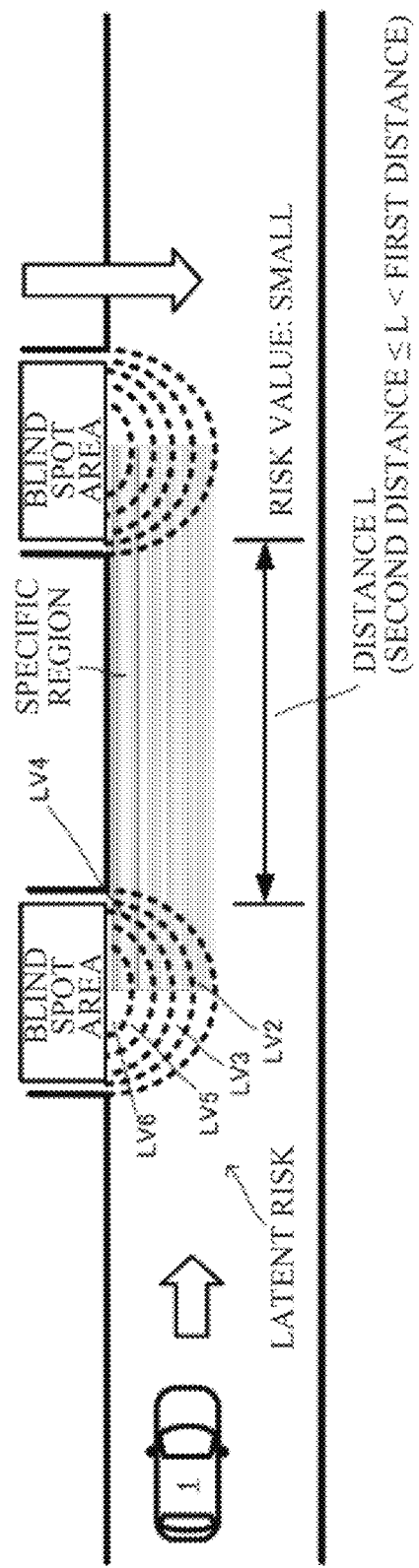
FIG. 8 is a diagram for describing the virtual risk and illustrating the relation between the blind spot areas, the latent risks, and the virtual risk according to one embodiment.
Figure 9:
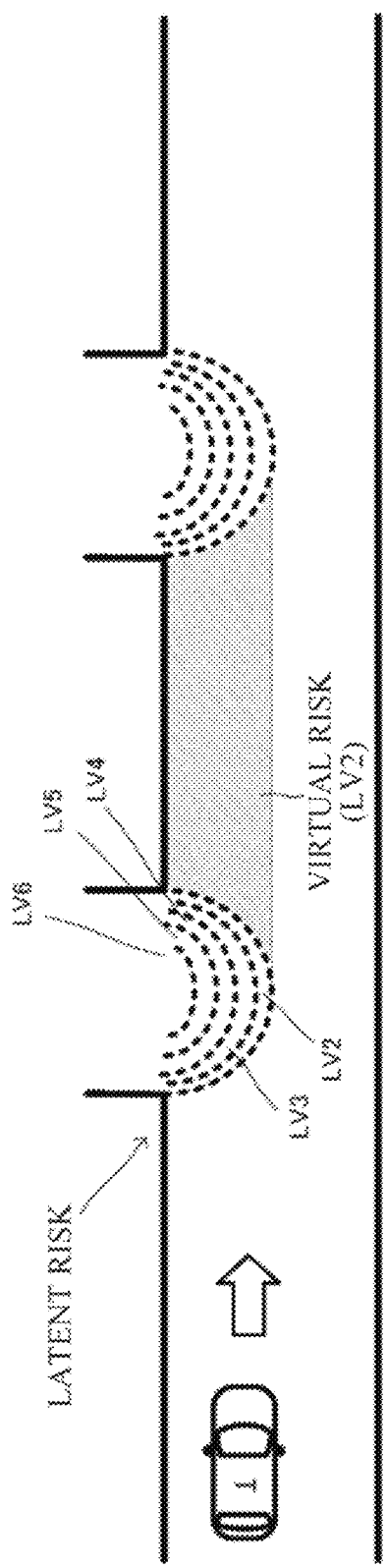
FIG. 9 is a diagram for describing the virtual risk and illustrating the relation between the blind spot areas, the latent risks, and the virtual risk according to one embodiment.

FIG. 6 is an explanatory diagram for describing a risk value (risk potential) indicating a risk value with respect to an obstacle according to the present embodiment. In the example illustrated in FIG. 6, the obstacle is a pedestrian. FIGS. 7 to 9 are diagrams for describing the virtual risk according to the present embodiment, and illustrates a relation between the blind spot areas, the latent risks, and the virtual risk.

(Basic Concept)

In the present embodiment, the value indicating the risk potential (hereinafter also referred to as "risk value") which increases as the own vehicle 1 comes closer to the obstacle is used to set the driving conditions such as the route and the speed of the own vehicle 1 in the automatic driving.

As illustrated in FIG. 6, the risk potential increases as the own vehicle 1 comes closer to the obstacle (pedestrian). The risk potential may be represented by an exponent function with respect to a distance xi from each obstacle, and thus indicated by Expression 1 described below, for example. Note that "Ri" denotes the risk value which is the risk potential, "Ci" denotes a risk absolute value (gain), "xi" denotes a distance from the obstacle, "Ti" denotes a gradient coefficient, "ri" denotes the radius of the obstacle, and "i" denotes the number for distinguishing obstacles. The gradient coefficient Ti is a value to be set regardless of the obstacle.

$$R_i = C_i \exp\left(-\frac{x_i - r_i}{T_i}\right). \qquad \text{Expression 1}$$

The risk absolute value Ci, which is the risk value corresponding to the distance xi between the own vehicle 1 and the obstacle of zero, is set in advance for each obstacle as a value depending on the obstacle. For example, when the obstacles are a "pedestrian" and a "low-profile curb stone", the risk absolute value Ci with respect to the "pedestrian" is set to a value greater than the risk absolute value Ci with respect to the "low-profile curb stone", assuming that the risk of a collision with the pedestrian is higher than the risk of a collision with the low-profile curb stone.

The risk distribution data is data indicating spatial overlapping of predetermined risk values assigned to the respective obstacles detected while the own vehicle 1 is moving, where the levels of the risk values are converted into data on a two-dimensional plane. That is, the risk distribution data is two-dimensional distribution data of the risk values Ri on which the risks of collisions with the obstacles present in the traveling direction of the vehicle are reflected. The "risk map" is a diagram of the risk distribution data. That is, the risk map refers to the map indicating the levels of the risk potentials in the form of contour lines on a two-dimensional plane.

In the present embodiment, it is possible to select the track and the speed of the own vehicle 1 that reduce the risk value on the two-dimensional plane by using the risk distribution data (or the risk map).

(Risk Distribution Data Having Virtual Risk)

The risk distribution data of the present embodiment basically includes the risk potentials based on the obstacles, i.e., the apparent risks, and latent risk potentials based on the blind spot areas serving as the blind spots for the driver, i.e., the latent risks. That is, the risk distribution data includes the risk values Ri (apparent) of the apparent risks and the risk values Ri (latent) of the latent risks of contact with the obstacles that are not visually recognizable due to the blind spot areas.

Examples of the latent risk include a risk to be caused by a pedestrian running out of the blind spot area for the vehicle when the own vehicle 1 passes by the blind spot area formed by an obstacle which is a vehicle stopped on a side road. The risk distribution data is basically the data on the risk potential distribution of the risk values Ri (apparent) of the apparent risks and the risk values Ri (latent) of the latent risks that are spatially overlapped with each other.

In addition to the above, the risk distribution data of the present embodiment includes the virtual risk that is a risk virtually set when the blind spot areas are located within the predetermined distance range located on either the front left side or the front right side of the traveling direction of the own vehicle 1. That is, in such a case, according to the present embodiment, the virtual risk, which is different from an actual risk such as the blind spot area set around the own vehicle, is set to prevent abrupt changes in speed and steering of the own vehicle.

Specifically, the virtual risk of the present embodiment is a risk which is different from the actual risks such as the obstacles or the blind spot areas set around the own vehicle automatic driving control and is virtually set to achieve smooth driver assistance in the automatic driving control.

The virtual risk of the present embodiment is set in a case where the blind spot areas are located on either the front left side or the front right side of the traveling direction of the own vehicle 1, and where the distance between the blind spot areas satisfies a virtual risk setting condition. In particular, the virtual risk is set in the specific region between the latent risks set based on the blind spot areas. Further, the virtual risk is set to a smaller risk value than the maximum value of the latent risks.

For example, when the blind spot areas satisfying the predetermined condition are detected as illustrated in FIG. 7, the specific region is set as illustrated in FIG. 8. That is, as illustrated in FIG. 8, the specific region is determined as a region between the detected blind spot areas defined by a boundary between one of the blind spot areas closer to the own vehicle 1 and a viewable area extending in the traveling direction farther from the own vehicle 1 and a boundary between the other of the blind spot areas remote from the own vehicle 1 and a viewable area extending in the traveling direction toward the own vehicle 1. Thereafter, as illustrated in FIG. 9, the virtual risk having a predetermined risk value is set in the specific region determined.

In the examples illustrated in FIGS. 7 to 9, the virtual risk is set completely in association with the specific region: however, the virtual risk may be set in a region different from the specific region as long as the virtual risk is associated with the specific region. For example, even when the blind spot areas and the specific region are not spatially integrated with each other and not spatially continuous to each other, the virtual risk may be set so as to be spatially integrated with and spatially continuous to the latent risks. In the examples illustrated in FIGS. 7 to 9, the maximum value of the risk levels (risk values) is 6 (LV6), and illustration of cases for a risk level 1 (LV1) and lower risk levels is omitted, as in FIGS. 3 and 4.

[B4.3] Latent Risk Setting Process

Next, a description is given of a latent risk setting process to be performed by the vehicle control system 10 of the present embodiment.

As described above, when the blind spot areas are detected upon the setting of the driving conditions such as the route and speed of the own vehicle 1 to be used for the automatic driving control during the automatic driving control, the driving condition setting unit 116 executes the latent risk setting process in which the latent risks are set. That is, when the blind spot areas are detected in the traveling direction of the own vehicle 1 based on the surrounding environment data of the own vehicle 1 acquired at a predetermined timing, the driving condition setting unit 116 executes the latent risk setting process in which the latent risks are set.

Specifically, when the presence of the blind spot areas is detected, the driving condition setting unit 116 executes the risk setting process in which respective values of the latent risks stored in advance in the data memory unit 142 are set in association with the blind spot areas based on the types of the blind spot areas. For example, upon the setting of the latent risks, the driving condition setting unit 116 sets the respective values of the latent risks based on the sizes and positions of the blind spot areas and the relative speeds with respect to the own vehicle 1, referring to the data stored in the data memory unit 142.

Further, when the presence of the blind spot areas is detected, the driving condition setting unit 116 assumes that objects such as pedestrians are present in the blind spot areas, and sets the latent risks including the risks of collisions with the objects running out of the blind spot areas. In particular, the object assumed to be present in the blind spot area varies depending on the size of the blind spot area. In addition, the patterns of the traveling direction or the traveling speed of the object assumed to be present in the blind spot area may be narrowed down after a predetermined time. In this case, the driving condition setting unit 116 determines the degree of the risk (latent risk) of the assumed object running out of the blind spot area into in front of the vehicle 1 traveling in the traveling direction based on a temporal change in the blind spot area and a predicted motion in the blind spot area of the object assumed to suddenly run out of the blind spot area. That is, the driving condition setting unit 116 determines an object assumed to be present in the blind spot area identified at the predetermined time and assumed to suddenly run out of the blind spot area by referring to the predetermined data, and sets the latent risk after the predetermined time based on the temporal change in the detected blind spot area and the predicted motion in the blind spot area of the object assumed to suddenly run out of the blind spot area.

Further, as illustrated in FIG. 6 described above, the driving condition setting unit 116 sets the risk value of the latent risk to the value which decreases as the distance from the blind spot area increases (i.e., as the own vehicle 1 goes away from the blind spot area).

In a case where an obstacle is detected and where the blind spot area is formed by the obstacle, the driving condition setting unit 116 reflects the latent risk based on the blind spot area on the apparent risk based on the obstacle in the latent risk setting process. Specifically, the driving condition setting unit 116 adjusts the apparent risk inherent in the type of the obstacle based on the size or the like of the obstacle by referring to the data stored in the data memory unit 142, and sets the adjusted apparent risk in association with the region in which the obstacle is detected. In particular, the driving condition setting unit 116 adjusts the apparent risk in the traveling direction of the own vehicle 1 based on the type, size, and position of the obstacle and the relative speed with respect to the own vehicle 1 by referring to the risk value of the corresponding obstacle stored in the data memory unit 142, and sets the adjusted apparent risk in association with the region in which the obstacle is detected. Thereafter, the driving condition setting unit 116 reflects the latent risk set as described above on the apparent risk set as described above.

In the latent risk setting process, the driving condition setting unit 116 sets the latent risks assuming that objects that will suddenly run out of the blind spot areas are present in the blind spot areas. Alternatively, the driving condition setting unit 116 may acquire the information on the objects assumed to suddenly run out of the blind spot areas from an external device, and may execute the latent risk setting process based on the acquired information. Specifically, the driving condition setting unit 116 may execute the risk setting process in which the latent risks to be generated after the predetermined time are set based on the information on the objects assumed to suddenly run out of the blind spot areas, and the predicted motions in the blind spot areas of the objects assumed to suddenly run out of the blind spot areas that are acquired through a V2X communication via a non-illustrated wireless communication network and the communicator 170.

[B4. 4] Virtual Risk Setting Process

Figure 10:
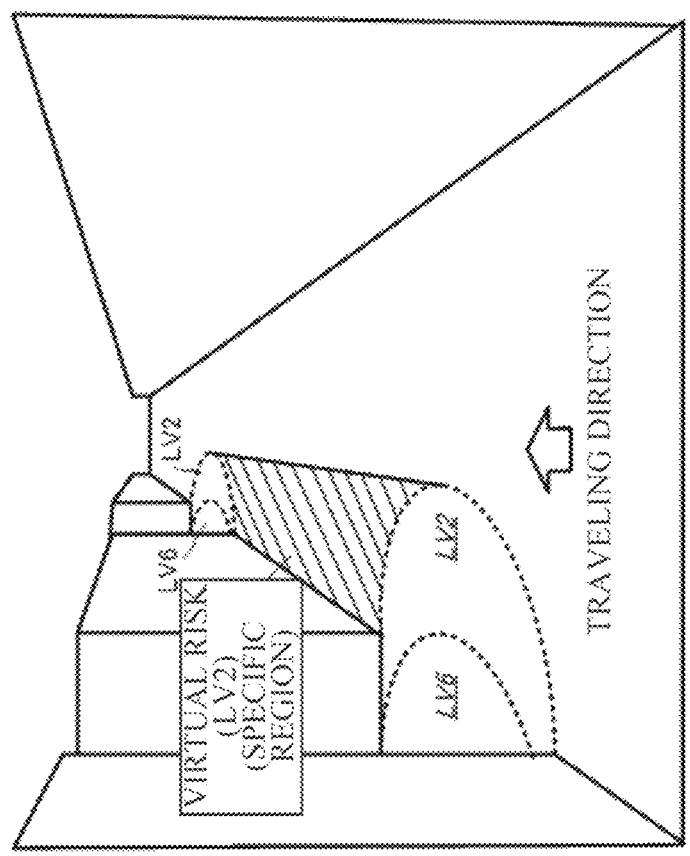
FIG. 10 is a diagram for describing a virtual risk setting process to be performed by the vehicle control system according to one embodiment.

Next, a virtual risk setting process to be performed by the vehicle control system 10 of the present embodiment is described with reference to FIG. 10. FIG. 10 is a diagram for describing the virtual risk setting process to be performed by the vehicle control system 10 of the present embodiment.
(Basic Principle)

In a case where the blind spot areas are located on either the front left side or the front right side of the traveling direction of the own vehicle 1, and where the distance between the blind spot areas satisfies the predetermined condition, the driving condition setting unit 116 performs the virtual risk setting process based on the set latent risks. That is, when the predetermined condition is satisfied in the detected blind spot areas the driving condition setting unit 116 sets the latent risks and the virtual risk. In particular, when the given condition is satisfied, the driving condition setting unit 116 performs the virtual risk setting process in which the virtual risk having a smaller risk value than the maximum value of the latent risks is set in an area between the latent risks (hereinafter referred to as "specific region") set based on the blind spot areas.

Specifically, the driving condition setting unit 116 performs a blind spot area condition determination process in which a determination is made as to whether blind spot areas are located on either the front left side or the front right side of the traveling direction of the own vehicle 1 based on the surrounding environment data of the own vehicle 1 acquired at a predetermined timing. That is, the driving condition setting unit 116 determines, in the blind spot area condition determination process, whether the condition that the blind spot areas are located on either the front left side or the front right side of the traveling direction of the own vehicle 1 is satisfied based on the acquired surround environment data of the own vehicle 1.

When it is determined in the blind spot area condition determination process that the blind spot areas are located, the driving condition setting unit 116 performs a virtual risk setting condition determination process in which a determination is made as to whether the blind spot areas of interest (hereinafter referred to as "target blind spot areas") satisfy a virtual risk setting condition.

After performing the blind spot area condition determination process and determining in the virtual risk setting condition determination process that the virtual risk setting condition is satisfied, the driving condition setting unit 116 sets the specific region between the target blind spot areas based on the positions of the target blind spot areas.

Lastly, after the specific region is set, the driving condition setting unit 116 sets the virtual risk having a smaller value than the maximum value of the latent risks in association with the set specific region in the virtual risk setting process.

Note that the driving condition setting unit 116 is configured to refrain from setting the virtual risk when the blind spot area condition is not satisfied in the blind spot area condition determination process. In addition, the driving condition setting unit 116 is configured to refrain from setting the virtual risk when the virtual risk setting condition is not satisfied even though the blind spot areas are located.

(Blind Spot Area Condition Determination Process)

The driving condition setting unit 116 detects the presence of obstacles and blind spot areas in the traveling direction of the own vehicle 1 based on the surrounding environment data acquired from the vehicle-outside imaging camera 31 and the surrounding environment sensor 32 at a predetermined timing. At this time, the driving condition setting unit 116 performs the blind spot area condition determination process in which the determination is made as to whether the blind spot areas are located on either the front left side or the front right side of the traveling direction of the own vehicle 1 and whether the distance between the blind spot areas satisfies the virtual risk setting condition.

For example, it is assumed that two blind spot areas located on the left side of the traveling direction of the own vehicle 1 are detected in the image data obtained by the vehicle-outside imaging camera 31, as illustrated in FIG. 5 described above. In this case, the driving condition setting unit 116 determines that the blind spot areas are located based on the two blind spot areas in the image data and identifies the two blind spot areas in the image data as the target blind spot areas.

(Virtual Risk Setting Condition Determination Process)

When it is determined in the blind spot area condition determination process that the blind spot areas are located on either the front left side or the front right side of the traveling direction of the own vehicle 1, the driving condition setting unit 116 measures the distance between the target blind spot areas as a target blind spot area distance based on the surrounding environment data. Thereafter, the driving condition setting unit 116 performs the virtual risk setting condition determination process in which the determination is made as to whether the measured blind spot area distance satisfies the virtual risk setting condition.

Specifically, the driving condition setting unit 116 determines whether the target blind spot area distance is less than the first distance determined in advance and greater than or equal to the second distance determined in advance.

As illustrated in FIG. 8 described above, for example, the driving condition setting unit 116 uses a distance in which abrupt changes in speed and steering amount will be caused by the latent risks set for the respective blind spot areas as the first distance of a target blind spot area distance L. Further, as illustrated in FIG. 8, for example, the driving condition setting unit 116 uses a distance which is less than or equal to the vehicle length and in which no abrupt change in speed or steering amount will be caused by the risks set for the respective blind spot areas as the second distance of the target blind spot area distance L. That is, the driving condition setting unit 116 uses the second distance to determine whether the virtual risk setting condition that the target blind spot area distance is greater than or equal to the vehicle length of the own vehicle 1 is satisfied.

(Setting of Specific Region)

When the virtual risk setting condition is satisfied, the driving condition setting unit 116 identifies the blind spot area located in front of the own vehicle 1 and closer to the own vehicle 1 in the traveling direction (hereinafter referred to as "first blind spot area") and the blind spot area located in front of the own vehicle 1 and farther from the own vehicle 1 in the traveling direction (hereinafter referred to as "second blind spot area") out of the target blind spot areas. Thereafter, the driving condition setting unit 116 determines the range from the boundary between the first blind spot area and the viewable area extending in the traveling direction farther from the own vehicle 1 to the boundary between the second blind spot area and the viewable area extending toward the own vehicle 1 in the traveling direction (i.e., a range of the traveling direction of the own vehicle 1) as the range of the specific region in the traveling direction. Lastly, the driving condition setting unit 116 sets the specific region based on a preset range extending in a width direction perpendicular to the traveling direction of the specific region and the range of the specific region in the traveling direction described above.

The range extending in the width direction of the specific region of the present embodiment may be a predetermined value such as 2 meters or a value that varies depending on a road condition such as the type or width of the road, for example.

(Setting of Virtual Risk)

When the specific region is set in the specific region setting process, the driving condition setting unit 116 performs, as the risk setting process, the virtual risk setting process in which the virtual risk having a smaller value than the maximum value of the latent risks is set in association with the set specific region. In particular, the driving condition setting unit 116 sets the virtual risk in association with the specific region based on the respective risk values of the latent risks in the virtual risk setting process. The virtual risk is spatially continuous to and integrated with the respective latent risks set for the blind spot areas.

Specifically, the driving condition setting unit 116 sets a risk level of the predetermined virtual risk along an outer edge of the specific region. The driving condition setting unit 116 sets the virtual risk so that an end of the outer edge of the specific region closer to the own vehicle 1 in the traveling direction or an end of the outer edge of the specific region farther from the own vehicle 1 in the traveling direction is formed continuous to and integrated with the risk distribution regions of the blind spot areas at the same level as the level of the virtual risk level. In particular, the driving condition setting unit 116 sets a risk having a predetermined risk value as the virtual risk.

For example, as illustrated in FIGS. 9 and 10 described above, the driving condition setting unit 116 couples the predetermined virtual risk (LV2) and the latent risks at the same risk level (LV2) set based on the respective blind spot areas to each other. That is, as illustrated in FIGS. 9 and 10 described above, the driving condition setting unit 116 sets the virtual risk formed continuous to and integrated with the risk distribution regions of the blind spot areas at the same level as the level of the virtual risk (LV2).

FIG. 10 is a bird's-eye view of the example of FIG. 9 seen from the above of the own vehicle 1. As in FIG. 9, the two blind spot areas satisfying the above-described condition are formed on the left side of the vehicle orientation direction, and the virtual risk at the risk level LV2 is set in the example illustrated in FIG. 10. In the example illustrated in FIG. 10, the maximum value of the risk levels (risk values) is 6 (LV6), and illustration of a risk level 1 (LV1) or lower is omitted, as in FIG. 9.

[B4.5] Risk Distribution Data Setting Process

Next, a description is given of the risk distribution data setting process to be performed by the vehicle control system 10 of the present embodiment.

The driving condition setting unit 116 sets the risk distribution data as a spatial risk potential in the traveling direction of the own vehicle 1 at a predetermined timing. In particular, the driving condition setting unit 116 sets the risk distribution data in a case where the driving conditions such as the route and the speed of the own vehicle 1 are set during the automatic driving control and where the latent risks are set (including the case in which the apparent risks are detected) or where the latent risks and the virtual risk are set.

Specifically, when the virtual risk is not set, the driving condition setting unit 116 sets a comprehensive risk potential distribution that includes spatial overlapping of the latent risks based on the detected blind spot areas. In this case, in particular, when an obstacle is detected, the driving condition setting unit 116 sets the apparent risk and the comprehensive risk potential distribution that includes spatial overlapping of the latent risks based on the blind spot areas.

In contrast, when the virtual risk is set, the driving condition setting unit 116 sets the comprehensive risk potential distribution that includes spatial overlapping of the latent risks (including the apparent risks if detected) and the virtual risk set in association with the specific region.

[B4.6] Driving Condition Setting Process

Next, a description is given of the driving condition setting process to be performed by the vehicle control system 10 of the present embodiment.

The driving condition setting unit 116 performs the driving condition setting process in which the driving conditions including the route and the speed of the own vehicle 1 are set based on the risk distribution data set in the risk distribution data setting process at each predetermined timing during the automatic driving control of the own vehicle 1

In particular, in the present embodiment, the upper and lower limits of an acceleration rate and a deceleration rate, and the upper limit of an angular velocity of a steering angle are determined in advance because abrupt acceleration, abrupt deceleration, and abrupt steering affect the ride comfort, slipping, or the like. The driving condition setting unit 116 sets the driving conditions within a range not exceeding these limits. In addition, the driving condition setting unit 116 of the present embodiment performs the driving condition setting process at predetermined timings such as every 100μ (sec). Note that the predetermined timings depend on the processing capacity of the ECU.

Specifically, the driving condition setting unit 116 sets the traveling route and the moving speed of the own vehicle 1 based on the risk distribution data set at the predetermined timings while referring to the current operational state and the current behavior data of the own vehicle 1.

Specifically, the driving condition setting unit 116 sets, based on the set risk distribution data, appropriate driving conditions for enabling the own vehicle 1 to travel and reducing the risk in traveling of the own vehicle 1 in the traveling direction at the current speed. In particular, the driving condition setting unit 116 sets a route, a speed, or a combination thereof that enables the own vehicle 1 to travel at an appropriate speed with a low traveling risk as the driving conditions.

For example, the driving condition setting unit 116 determines the route that enables the own vehicle 1 to pass by risk levels lower than or equal to the risk level defined in advance by the driver (hereinafter also referred to as "driver-defined risk"). In particular, when risks are set on the left and right sides of the traveling direction, the driving condition setting unit 116 sets a region having a risk lower than the driver-defined risk determined in advance in a road width direction, which is a lateral direction with respect to the traveling direction, and sets a route to pass through the region.

Alternatively, considering the upper and lower limits set in advance, the driving condition setting unit 116 sets a higher speed when the width between specific risk levels (e.g., the driver-defined risks) set on the left and right sides of the traveling direction is large, while setting a lower speed when the width is small, for example. The driving condition setting unit 116 sets the speed as the driving condition using table data of speeds determined in association with the width.

[B5] Procedure of Present Embodiment

Figure 11:
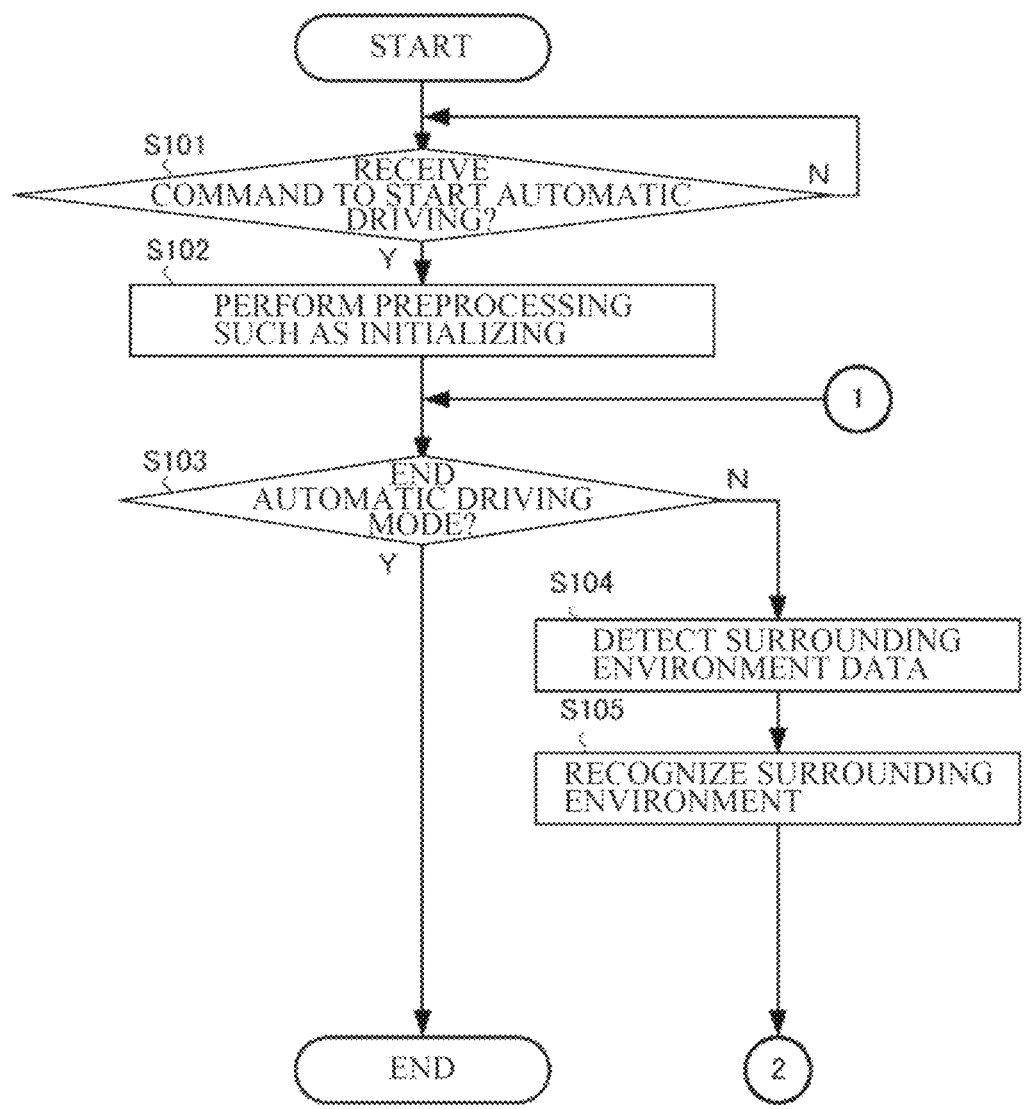
FIG. 11 is a flowchart of operations of a driver assistance control process in the automatic driving control to be performed by the driver assistance control apparatus according to one embodiment.
Figure 12:
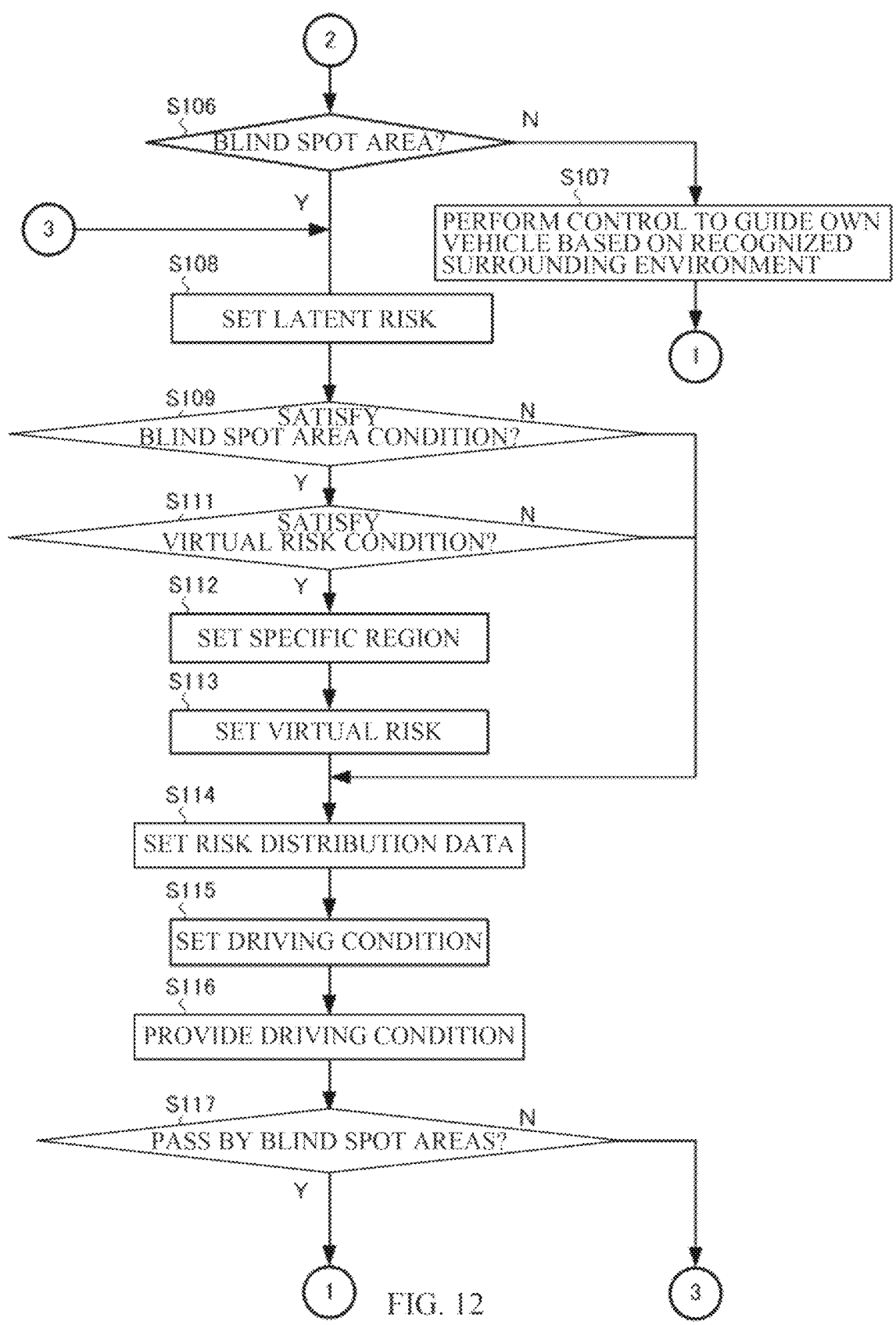
FIG. 12 is a flowchart of the operations of the driver assistance control process in the automatic driving control to be performed by the driver assistance control apparatus according to one embodiment.

Next, a procedure of a driving assistance control process in the automatic driving control to be performed by the driver assistance control apparatus 100 of the present embodiment is described with reference to FIGS. 11 and 12. FIGS. 11 and 12 are flowcharts of the procedure of the driver assistance control process in the automatic driving control to be performed by the driver assistance control apparatus 100 of the present embodiment.

The procedure includes operations to be performed from the start to the end of the automatic driving control to execute the automatic driving control based on the setting of the driving condition and a command for the set driving condition.

First, when detecting a command to start the automatic driving mode (Step S101), the driving condition setting unit 116 performs preprocessing such as initializing the driver assistance control apparatus 100 (Step S102). At this time, the vehicle-outside imaging camera 31 and the surrounding environment sensor 32 start operations relevant to the automatic driving mode.

Thereafter, the driving condition setting unit 116 determines whether a command to end the automatic driving mode has been received from the driver, for example (Step S103). When it is determined that the command to end the driver assistance control process has been received, the driving condition setting unit 116 ends the procedure. When it is determined that the command to end the driver assistance control process has not been received, the driving condition setting unit 116 causes the procedure to proceed to an operation at Step S104.

Thereafter, when it is determined that the command to end the driver assistance control process has not been received, the surrounding environment detection unit 112 detects the surrounding environment data sent from the vehicle-outside imaging camera 31, the surrounding environment sensor 32, or both of the vehicle-outside imaging camera 31 and the surrounding environment sensor 32 (Step S104).

Thereafter, the surrounding environment detection unit 112 recognizes the surrounding environment such as an obstacle present around the own vehicle 1 based on the detected surrounding environment data (Step S105).

Thereafter, the surrounding environment detection unit 112 determines (detects) whether the blind spot areas are present in the recognized surrounding environment (Step S106). In particular, the surrounding environment detection unit 112 determines the presence of the blind spot areas, which are not visually recognizable by the driver, based on the surrounding environment data sent from the vehicle-outside imaging camera 31 or the surrounding environment sensor 32, for example.

When it is determined by the surrounding environment detection unit 112 that no blind spot area is present, the driving condition setting unit 116 performs control to guide the own vehicle 1 based on the recognized surrounding environment, including an obstacle, of the own vehicle 1 in conjunction with the vehicle driving control processor 40 (Step S107). That is, when an obstacle is present, the driving condition setting unit 116 performs the guidance control to cause the own vehicle 1 to travel avoiding the obstacle by identifying the type, position, size of the obstacle, and a relative speed between the obstacle and the own vehicle 1, and considering the risks to be caused by the presence of the obstacle.

In contrast, it is determined that the blind spot areas are present in the recognized surrounding environment, the driving condition setting unit 116 sets the latent risks based on the recognized blind spot areas (Step S108). In particular, when the obstacle is detected, the driving condition setting unit 116 sets the apparent risk based on the obstacle together with the latent risks.

Thereafter, the driving condition setting unit 116 performs the blind spot area condition determination process in which the determination as to whether multiple blind spot areas are detected on either the front left side or the front right side of the traveling direction of the own vehicle 1 (whether the blind spot area condition is satisfied) (Step S109). When it is determined that multiple blind spot areas of interest (the target blind spot areas) are not detected, the driving condition setting unit 116 causes the procedure to proceed to an operation at Step S114. When it is determined that multiple target blind spot areas are detected, the driving condition setting unit 116 causes the procedure to proceed to an operation at Step S111.

When it is determined that the target blind spot areas are detected in the blind spot area condition setting process, the driving condition setting unit 116 performs the virtual risk setting condition determination process in which the determination as to whether the target blind spot areas satisfy the virtual risk setting condition (Step S111).

Specifically, the driving condition setting unit 116 measures the target blind spot area distance between the target blind spot areas based on the surrounding environment data acquired in Step S104, and determines whether the measured target blind spot area distance satisfies the virtual risk setting condition. When it is determined that the target blind spot areas do not satisfy the virtual risk setting condition, the driving condition setting unit 116 causes the procedure to proceed to an operation at Step S114. When it is determined that the target blind spot areas satisfy the virtual risk setting condition, the driving condition setting unit 116 causes the procedure to proceed to an operation at Step S112.

Thereafter, when it is determined that the target blind spot areas satisfy the virtual risk setting condition, the driving condition setting unit 116 sets the specific region based on the target blind spot areas (Step S112). Specifically, the driving condition setting unit 116 identifies the first and second blind spot areas, identifies the range extending in the width direction perpendicular to the first and second blind spot areas, and sets the specific region.

Thereafter, the driving condition setting unit 116 sets the virtual risk in association with the specific region identified based on the target blind spot areas while setting the apparent risks and the latent risks (Step S113). Specifically, the driving condition setting unit 116 performs the virtual risk setting process in which the virtual risk having a smaller value than the maximum value of the latent risks is set in association with the set specific region. In particular, the driving condition setting unit 116 sets the virtual risk which is formed spatially continuous to and integrated with the latent risks of the respective blind spot areas based on the respective risk values of the latent risks, as the virtual risk setting process.

Thereafter, based on the risks set in the risk setting process, the driving condition setting unit 116 sets the risk distribution data as a spatial risk potential in the traveling direction of the own vehicle 1 (Step S114). Specifically, when the virtual risk is set, the driving condition setting unit 116 generates the risk distribution data based on the apparent risks, the latent risks, and the virtual risk. In contrast, when the virtual risk is not set, the driving condition setting unit 116 generates the risk distribution data based on the apparent risks and the latent risks.

Thereafter, based on the set risk distribution data, the driving condition setting unit 116 sets new driving conditions including a route and a speed of the own vehicle 1 (Step S115), and provides the set driving conditions to the vehicle driving control processor 40 (Step S116).

Thereafter, based on various pieces of data sent from the vehicle-outside imaging camera 31 and the surrounding environment sensor 32, the surrounding environment detection unit 112 determines whether the own vehicle 1 has passed by the blind spot area (if there are multiple blind spot areas, all of the blind spot areas) located around the own vehicle 1 or in the traveling direction of the own vehicle 1 (Step S117). When it is determined that the own vehicle 1 has not passed by the blind spot area(s), the surrounding environment detection unit 112 causes the procedure to proceed to the operation at Step S111. When it is determined that the target blind spot area is no longer detected, the surrounding environment detection unit 112 causes the procedure to proceed to an operation at Step S103.

[B6] Modification Example

[B6.1] Modification Example 1: Case in which Virtual Risk Value Varies

Figure 13:
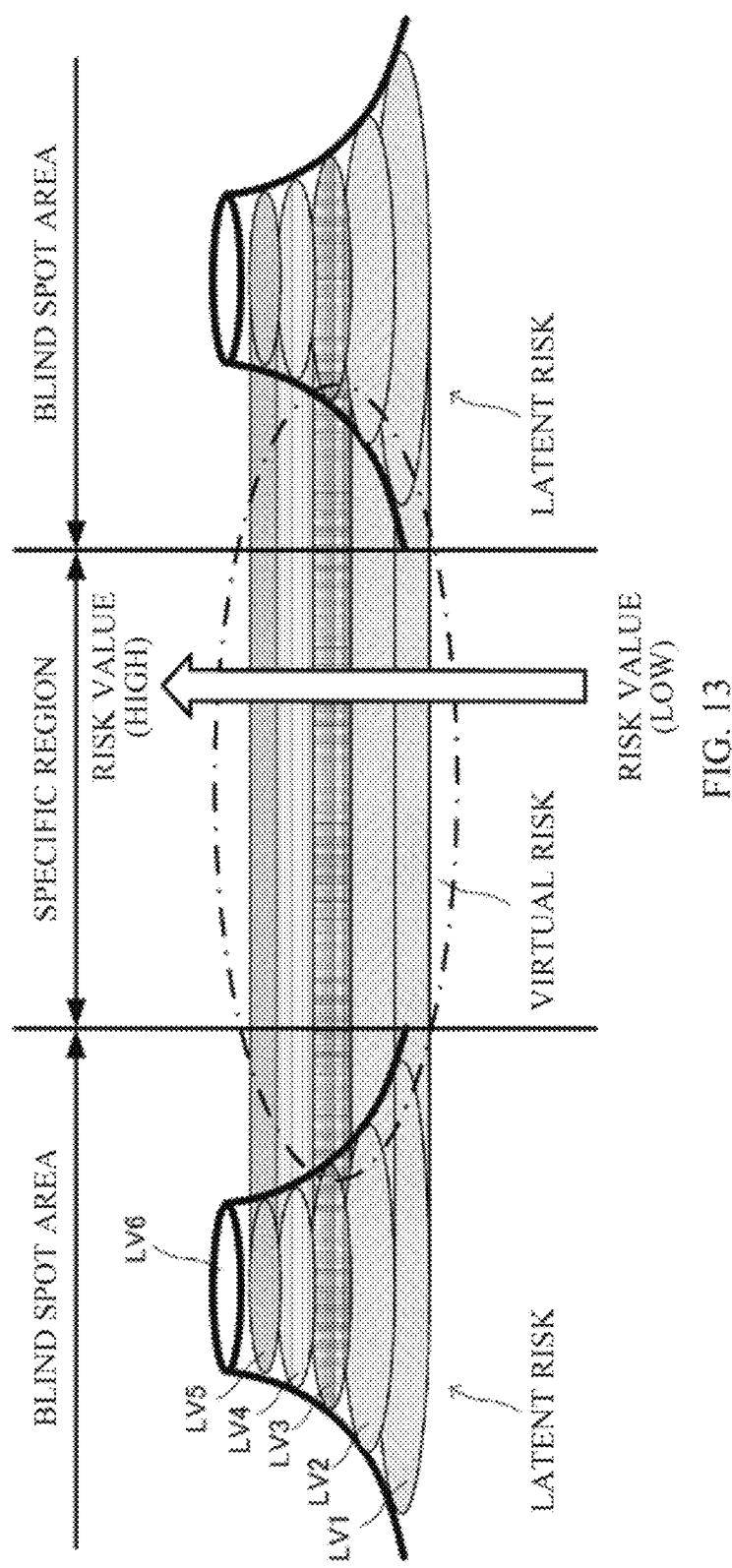
FIG. 13 is a diagram for describing Modification Example 1 in which the virtual risk value varies.
Figure 14:
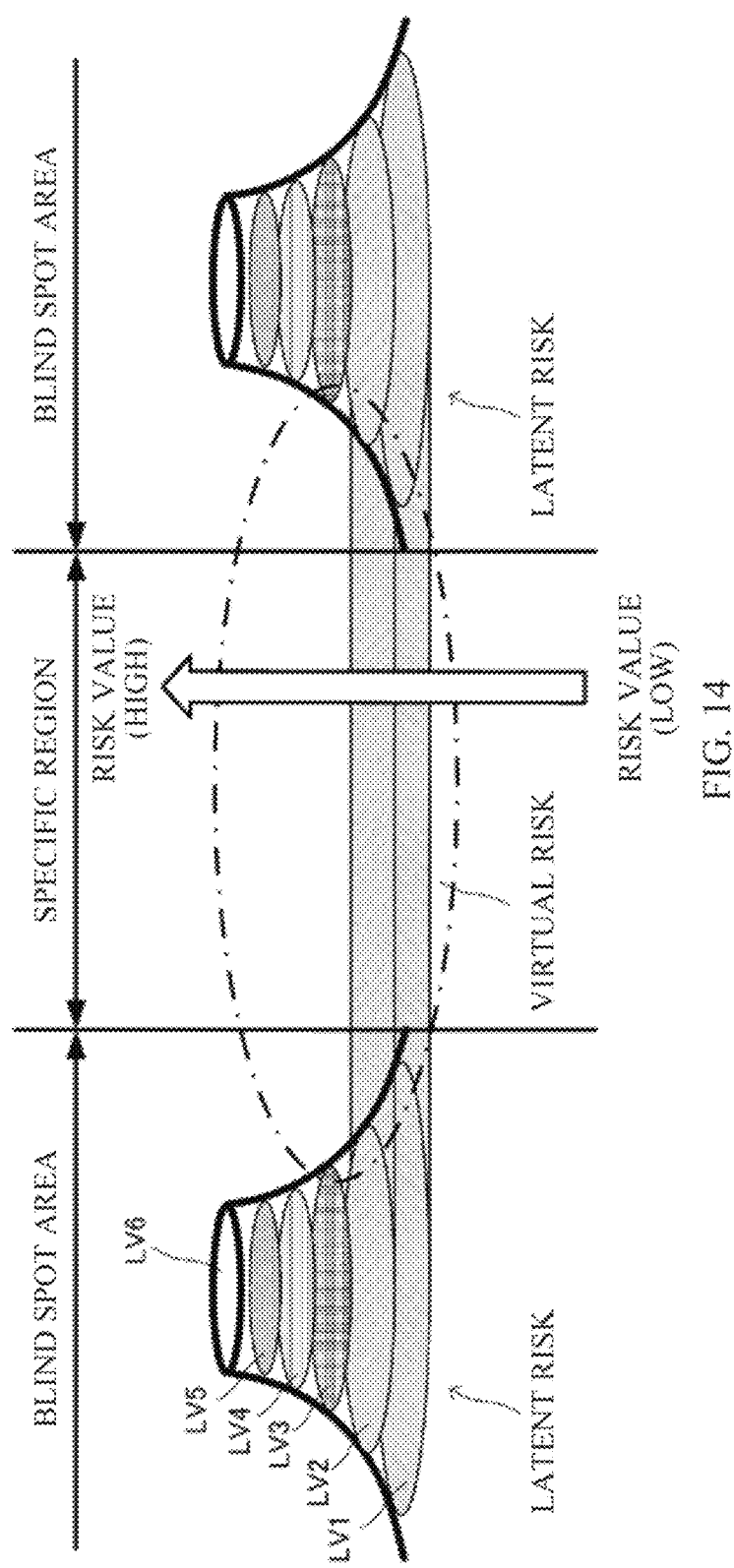
FIG. 14 is a diagram for describing Modification Example 1 in which the virtual risk value varies.

Next, Modification Example 1 of the present embodiment in which the virtual risk value varies is described with reference to FIGS. 13 and 14. FIGS. 13 and 14 are diagrams for describing Modification Example 1 of the present embodiment in which the virtual risk value varies.

Although the virtual risk is set to a constant value (risk value) in the above-described embodiment, the virtual risk value may vary depending on the speed of the own vehicle 1 in the automatic driving control.

For example, a steering amount not enough to cause abrupt steering when the speed of the own vehicle 1 is low often causes abrupt steering when the speed of the own vehicle 1 is high. Further, when the apparent risks and the latent risks are present on an opposite side to the side on which the virtual risk is set, the route of the own vehicle 1 is determined based on a comparison measurement between the virtual risk and the risks present on the opposite side. Thus, in this case, it is more difficult to select a route adjacent to the virtual risk as the virtual risk value increases, while it is easier to select a route adjacent to the virtual risk as the virtual risk value decreases. It is therefore essentially desirable that the virtual risk be low when the vehicle speed is low.

Accordingly, the driver assistance control apparatus 100 of the modification example is configured to change the risk value of the virtual risk depending on the vehicle speed in order to widen the settable range of the driving conditions in the automatic driving control, and achieve appropriate control considering the relation with the other risks. In particular, when the speed of the own vehicle 1 is lower than a predetermined reference speed, the driver assistance control apparatus 100 of the modification example performs the risk setting process in which the virtual risk value is set to a smaller value than the virtual risk value to be set when the speed of the own vehicle 1 is higher than the predetermined reference speed.

Specifically, in the virtual risk setting process, the driving condition setting unit 116 determines whether the speed of the own vehicle 1 is lower or higher than the predetermined reference speed (hereinafter referred to as "reference speed"). As illustrated in FIG. 13, when the speed of the own vehicle 1 is higher than or equal to the reference speed, the driving condition setting unit 116 sets a high risk level such as LV5 as the risk level of the virtual risk. As illustrated in FIG. 14, when the speed of the own vehicle 1 is lower than the reference speed, the driving condition setting unit 116 sets a low risk level such as LV2 as the risk level of the virtual risk.

That is, when the vehicle speed is high, the driving condition setting unit 116 sets a high virtual risk value to prevent abrupt steering. In particular, even at the same steering angle, a lateral acceleration rate (lateral G) of the vehicle generated by steering is larger when the vehicle travels at a high vehicle speed than when the vehicle travels at a low vehicle speed. The driving condition setting unit 116 therefore sets the risk level of the virtual risk to a high risk level such as LV5 to limit the setting of the route adjacent to the virtual risk.

In contrast, when the vehicle speed is low, for example, the driving condition setting unit 116 sets a low virtual risk value such as LV2 to set an optimal route and an optimal speed considering various risks including the risks set on the opposite side to the side on which the virtual risk is set.

FIG. 13 illustrates a relation between the latent risks (including the apparent risks) and the virtual risk, where the virtual risk is set based on the risk level LV5 of the latent risks set for the blind spot areas. FIG. 14 illustrates a relation between the latent risks (including the apparent risks) and the virtual risk, where the virtual risk is set based on the risk level LV2 of the latent risks set for the blind spot areas.

The driver assistance control apparatus 100 according to the modification example having such a configuration makes it possible to determine the driving conditions such as a route and a speed, considering the relation between abrupt steering and the steering amount that varies depending on the vehicle speed. Accordingly, it is possible to achieve smooth driving in the automatic driving control.

The driver assistance control apparatus 100 according to the modification example therefore makes it possible to set the route and the speed that appropriately avoid any risk generated around the own vehicle. Accordingly, it is possible to achieve smooth driving under the automatic driving control. Further, the driver assistance control apparatus 100 of the modification example makes it possible to reduce a calculation load upon setting the driving conditions by using the virtual risk depending on the situation.

[B6.2] Modification Example 2: Case in which Blind Spot Areas Move

Figure 15:
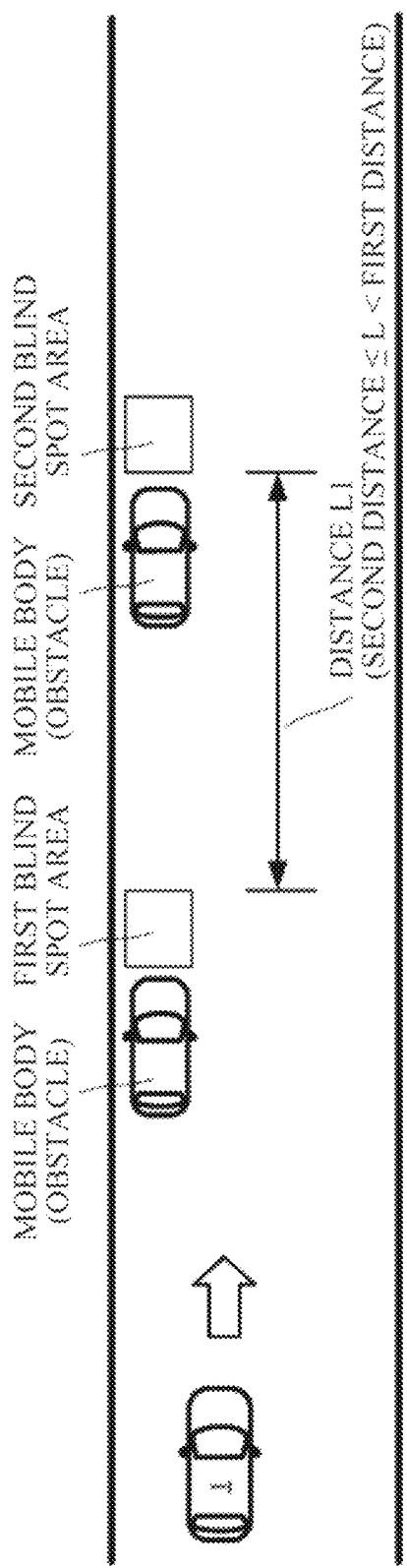
FIG. 15 is a diagram for describing Modification Example 2 in which the blind spot areas for which the latent risks are to be set move, and conditions set upon the setting of the virtual risk are cancelled after the setting of the virtual risk.
Figure 16:
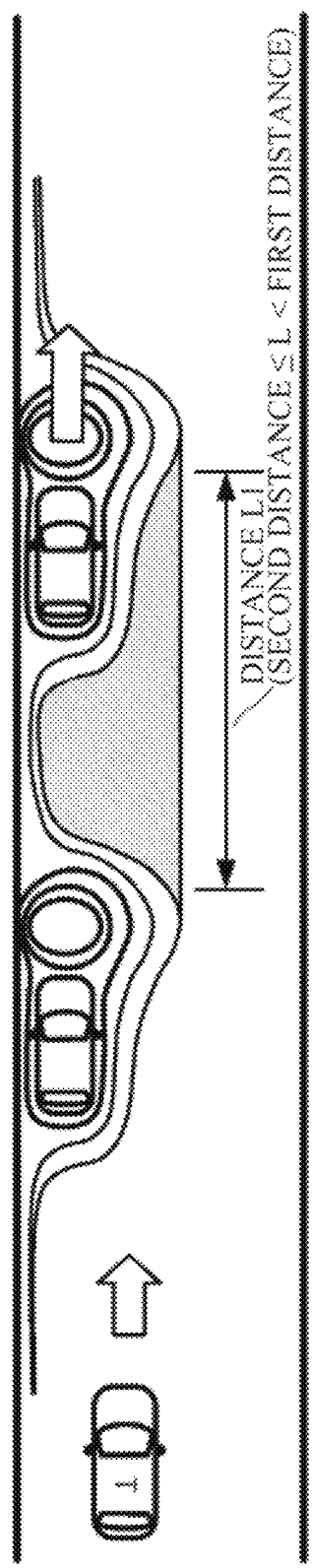
FIG. 16 is a diagram for describing Modification Example 2 in which the blind spot areas for which the latent risks are to be set move, and the conditions set upon the setting of the virtual risk are cancelled after the setting of the virtual risk.
Figure 17:
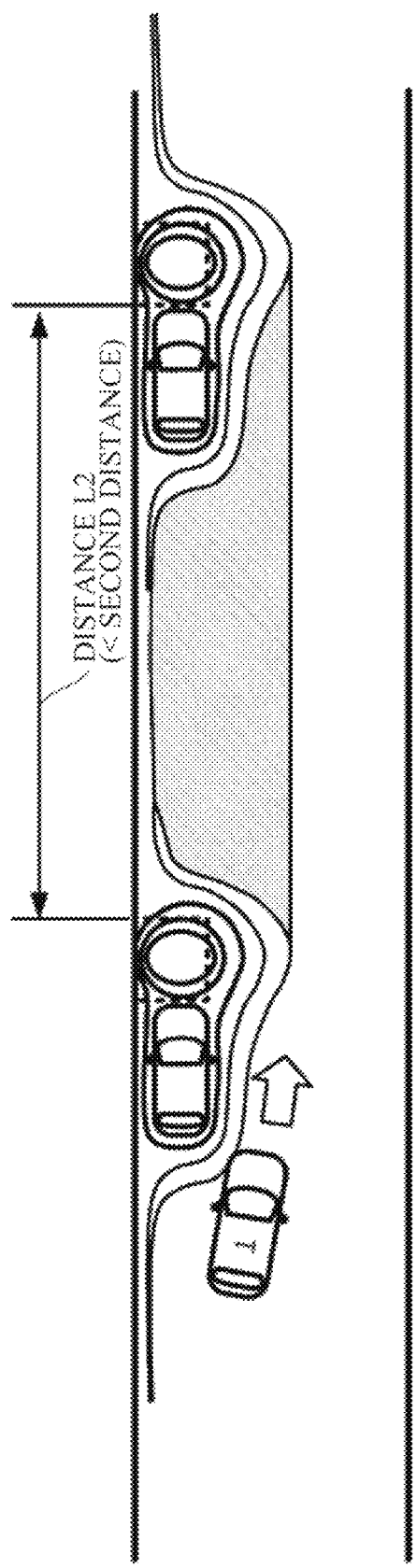
FIG. 17 is a diagram for describing Modification Example 2 in which the blind spot areas for which the latent risks are to be set move, and the conditions set upon the setting of the virtual risk are cancelled after the setting of the virtual risk.

Next, Modification Example 2 of the present embodiment is described with reference to FIGS. 15 to 17. In this modification example, the blind spot areas for which the latent risks are to be set move, and the conditions set upon the setting of the virtual risk are cancelled after the setting of the virtual risk. FIGS. 15 to 17 are diagrams for describing Modification Example 3 of the present embodiment in which the blind spot areas for which the latent risks are to be set move, and the conditions set upon the setting of the virtual risk are cancelled after the setting of the virtual risk.

The driver assistance control apparatus 100 of the modification example is characterized in that one of the blind spot areas is movable during the automatic driving control, and that the virtual risk is maintained even if the conditions set upon the setting of the virtual risk are cancelled after the setting of the virtual risk.

In the embodiment described above, in a case where the virtual risk is set and where a mobile body forming the second blind spot area moves before the own vehicle 1 passes by the first blind spot area, no virtual risk is set in the subsequent virtual risk setting process because the virtual risk setting condition is not satisfied. However, if the virtual risk is not set as in this case, abrupt changes in speed and steering of the own vehicle will occur upon determination of the route and the speed of the own vehicle 1.

Accordingly, even in such a case, the vehicle control system 10 of the modification example may keep performing the virtual risk setting process until the own vehicle 1 passes by the second blind spot area to prevent the abrupt changes in speed and the like of the own vehicle 1.

Specifically, even when mobile bodies are detected as obstacles as illustrated in FIGS. 15 and 16, the driving condition setting unit 116 sets the virtual risk in the specific region if the blind spot area condition and the virtual risk setting condition are satisfied, as in the case described above. Further, as illustrated in FIG. 17, the driving condition setting unit 116 sets or maintains the virtual risk by forcibly determining that the virtual risk setting condition is satisfied until the own vehicle 1 passes by the second blind spot area.

[C] Others

The embodiments of the disclosure are not limited to those described in the above embodiments, and various modifications may be made. For example, the terms used as broad or synonymous terms in one description of the specification or the drawings may be replaced with the broad or synonymous terms in the other descriptions of the specification or the drawings.

Embodiments of the disclosure include configurations substantially the same as the configurations described in the above embodiments (for example, configurations having the same function, method, and result, or configurations having the same purpose and effect). Further, embodiments of the disclosure include configurations in which non-essential portions of the configurations described in the above embodiments are replaced. Further, embodiments of the disclosure include configurations that achieve the same operations and effects, or configurations that achieve the same object as the configurations described in the above embodiments. Further, embodiments of the disclosure include configurations in which known techniques are added to the configurations described in the above embodiments.

Although embodiments of the disclosure have been described in detail above, those skilled in the art would readily appreciate that many variations are substantially possible without departing from the new matter and effect of the invention. Accordingly, all of these modifications are intended to be included within the scope of the embodiments of the present disclosure.

DESCRIPTION OF REFERENCE NUMERALS

1: Vehicle (own vehicle)
3: Wheels
9: Drive power unit
10: Vehicle control system
13: Steering wheel
15: Electric steering device
20: Management server
27: Vehicle Behavior sensor
29: GNSS antenna
31: Vehicle-outside imaging camera
32: Surrounding environment sensor
33: Map data memory
40: Vehicle driving control processor
43: HMI
100: Driver assistance control apparatus
110: Processor
111: Communication control unit
112: Surrounding environment detection unit
113: Vehicle data acquisition unit
116: Driving condition setting unit
117: Notification control unit
140: Memory
141: Main memory unit
142: Data memory unit
150: Information storage medium
170: Communicator

The invention claimed is:

1. A driver assistance apparatus configured to execute a driver assistance process in which latent risks are set based on blind spot areas of an own vehicle, and driving of the own vehicle is assisted to reduce risks of collisions with objects running out of the blind spot areas, the driver assistance apparatus comprising:
one or more processors; and
one or more memories communicably coupled to the one or more processors, wherein
the one or more processors are configured to:
in a case where the blind spot areas are located on either a front left side or a front right side of a traveling direction of the own vehicle, and where a distance between the blind spot areas satisfies a predetermined condition, execute a risk setting process in which a virtual risk is set in a specific region located between the latent risks set based on the blind spot areas, the virtual risk comprising a risk having a smaller value than a maximum value of the latent risks;
execute a risk distribution data generation process in which risk distribution data is generated based on the latent risks and the virtual risk, the risk distribution data indicating a risk distribution in the traveling direction with respect to the own vehicle;
set a driving condition based on the risk distribution data; and
control, based on the driving condition, at least one of a steering wheel angle and a braking force of the own vehicle to cause the own vehicle to travel a route that avoids collisions with objects running out of the blind spot areas.

2. The driver assistance apparatus according to claim 1, wherein the predetermined condition includes a condition that the distance between the blind spot areas is less than a first distance determined in advance and is greater than or equal to a second distance determined in advance.

3. The driver assistance apparatus according to claim 2, wherein the second distance comprises a value determined based on a vehicle length value.

4. The driver assistance apparatus according to claim 1, wherein the driver assistance apparatus is configured to execute, as the risk setting process, a process in which risk values that decrease as distances from the blind spot areas increase are set when the latent risks are set, and a process in which the virtual risk is set based on the risk values of the latent risks, the virtual risk being spatially continuous to and integrated with the latent risks set based on the respective blind spot areas.

5. The driver assistance apparatus according to claim 4, wherein the driver assistance apparatus is configured to execute the risk setting process in which, when a speed of the own vehicle is lower than a predetermined reference speed, a value of the virtual risk is set to a smaller value than a virtual risk to be set when the speed of the own vehicle is higher than the predetermined reference speed.

6. The driver assistance apparatus according to claim 1, wherein the one or more processors are configured to execute the risk setting process in which the blind spot areas are identified at a predetermined time, the objects possibly present in the blind spot areas identified are assumed, and the latent risks after the predetermined time are set based on a temporal change in the blind spot areas identified, and predicted motions in the blind spot areas of the objects assumed.

7. A vehicle comprising a driver assistance apparatus configured to execute a driver assistance process in which latent risks are set based on blind spot areas of an own vehicle, and driving of the own vehicle is assisted to reduce risks of collisions with objects running out of the blind spot areas, wherein
the driver assistance apparatus is configured to:
execute, in a case where the blind spot areas are located on either a front left side or a front right side of a traveling direction of the own vehicle, and where a distance between the blind spot areas satisfies a predetermined condition, a risk setting process in which a virtual risk is set in a specific region located between the latent risks set based on the blind spot areas, the virtual risk comprising a risk having a smaller value than a maximum value of the latent risks;

execute a risk distribution data generation process in which risk distribution data is generated based on the latent risks and the virtual risk, the risk distribution data indicating a risk distribution in the traveling direction with respect to the own vehicle;

set a driving condition based on the risk distribution data; and control, based on the driving condition, at least one of a steering wheel angle and a braking force of the own vehicle to cause the own vehicle to travel a route that avoids collisions with objects running out of the blind spot areas.

8. A non-transitory tangible machine-readable recording medium storing a computer program to be applied to a driver assistance apparatus configured to execute a driver assistance process in which latent risks are set based on blind spot areas of an own vehicle, and driving of the own vehicle is assisted to reduce risks of collisions with objects running out of the blind spot areas, the recording medium causing a computer to:

execute, in a case where the blind spot areas are located on either a front left side or a front right side of a traveling direction of the own vehicle, and where a distance between the blind spot areas satisfies a predetermined condition, a risk setting process in which a virtual risk is set in a specific region located between the latent risks set based on the blind spot areas, the virtual risk comprising a risk having a smaller value than a maximum value of the latent risks;

execute a risk distribution data generation process in which risk distribution data is generated based on the latent risks and the virtual risk, the risk distribution data indicating a risk distribution in the traveling direction with respect to the own vehicle;

set a driving condition based on the risk distribution data; and control, based on the driving condition, at least one of a steering wheel angle and a braking force of the own vehicle to cause the own vehicle to travel a route that avoids collisions with objects running out of the blind spot areas.

9. A driver assistance method of executing a driver assistance process in which latent risks are set based on blind spot areas of an own vehicle, and driving of the own vehicle is assisted to reduce risks of collisions with objects running out of the blind spot areas, the method comprising:

executing, in a case where the blind spot areas are located on either a front left side or a front right side of a traveling direction of the own vehicle, and where a distance between the blind spot areas satisfies a predetermined condition, a risk setting process in which a virtual risk is set in a specific region located between the latent risks set based on the blind spot areas, the virtual risk comprising a risk having a smaller value than a maximum value of the latent risks;

executing a risk distribution data generation process in which risk distribution data is generated based on the latent risks and the virtual risk, the risk distribution data indicating a risk distribution in the traveling direction with respect to the own vehicle;

setting a driving condition based on the risk distribution data; and controlling, based on the driving condition, at least one of a steering wheel angle and a braking force of the own vehicle to cause the own vehicle to travel a route that avoids collisions with objects running out of the blind spot areas.

* * * * *